United States Patent
Atzler et al.

(10) Patent No.: US 12,553,014 B2
(45) Date of Patent: Feb. 17, 2026

(54) SYSTEM, METHOD AND DEVICE FOR CULTURE OF A MULTICELLULAR STRUCTURE

(71) Applicant: Molecular Devices (Austria) GmbH, Hallein (AT)

(72) Inventors: Josef Atzler, Hallein (AT); Andreas Kenda, Hallein (AT)

(73) Assignee: Molecular Devices (Austria) GmbH (AT)

( * ) Notice: Subject to any disclaimer, the term of this patent is extended or adjusted under 35 U.S.C. 154(b) by 767 days.

(21) Appl. No.: 17/799,006

(22) PCT Filed: Feb. 1, 2021

(86) PCT No.: PCT/IB2021/050806
§ 371 (c)(1),
(2) Date: Aug. 11, 2022

(87) PCT Pub. No.: WO2021/161130
PCT Pub. Date: Aug. 19, 2021

(65) Prior Publication Data
US 2023/0062382 A1 Mar. 2, 2023

Related U.S. Application Data

(60) Provisional application No. 62/976,151, filed on Feb. 13, 2020.

(51) Int. Cl.
*C12M 3/00* (2006.01)
*C12M 1/12* (2006.01)
(Continued)

(52) U.S. Cl.
CPC ............ *C12M 21/08* (2013.01); *C12M 23/12* (2013.01); *C12M 23/44* (2013.01); *C12M 25/14* (2013.01); *C12M 35/02* (2013.01); *C12M 35/06* (2013.01)

(58) Field of Classification Search
CPC ...... C12M 21/08; C12M 23/12; C12M 23/44; C12M 23/42; C12M 25/14; C12M 35/02; C12M 35/06; C12M 35/04
See application file for complete search history.

(56) References Cited

U.S. PATENT DOCUMENTS

2005/0048642 A1   3/2005  Bunn et al.
2006/0293724 A1*  12/2006  Kronberg ............... C12M 35/02
                                                      607/51
(Continued)

FOREIGN PATENT DOCUMENTS

CN        103298922 A      9/2013
JP        2007-505316 A    3/2007
(Continued)

OTHER PUBLICATIONS

International Search Report and Written Opinion of the International Searching Authority for International Patent Application No. PCT/IB2021/050806 mailed Jun. 21, 2021, 18 pages.
(Continued)

*Primary Examiner* — Michael L Hobbs
(74) *Attorney, Agent, or Firm* — Merchant & Gould P.C.

(57) ABSTRACT

Systems, methods, and devices for culturing a multicellular structure, such as an organoid. An exemplary system comprises a vessel, an electric/magnetic module, and a control circuit. The vessel may include a culture chamber to contain a multicellular structure. The electric/magnetic module may be configured to be located in the vessel, at a position in or adjacent the culture chamber. The control circuit may be configured to wirelessly power and/or operate the electric/magnetic module.

9 Claims, 20 Drawing Sheets

(51) Int. Cl.
    *C12M 1/32*    (2006.01)
    *C12M 1/42*    (2006.01)

(56)           References Cited

U.S. PATENT DOCUMENTS

| | | | |
|---|---|---|---|
| 2013/0267003 A1* | 10/2013 | Goodwin | C12N 5/0062 |
| | | | 435/173.1 |
| 2017/0137766 A1 | 5/2017 | Dhimolea et al. | |
| 2020/0199506 A1* | 6/2020 | Flynn | C12M 23/20 |

FOREIGN PATENT DOCUMENTS

| | | | | |
|---|---|---|---|---|
| JP | 2019-146548 A | 9/2019 | | |
| JP | 2019-193035 | 10/2019 | | |
| JP | 2021-065156 A | 4/2021 | | |
| WO | WO-2016004015 A1 * | 1/2016 | | C12M 21/08 |
| WO | 2018/079793 | 5/2018 | | |
| WO | 2018/186426 | 10/2018 | | |
| WO | 2018/235477 | 12/2018 | | |
| WO | 2019/106438 A1 | 6/2019 | | |
| WO | 2020/013845 A1 | 1/2020 | | |

OTHER PUBLICATIONS

PCT International Preliminary Report on Patentability in Application PCT/IB2021/050806, mailed Aug. 25, 2022, 13 pages.

* cited by examiner

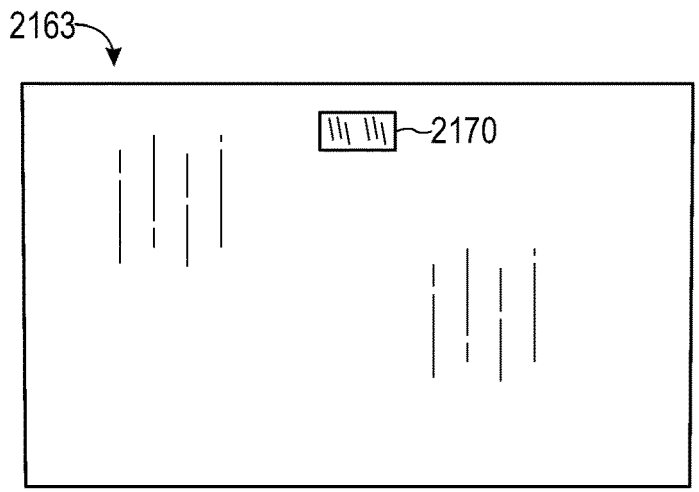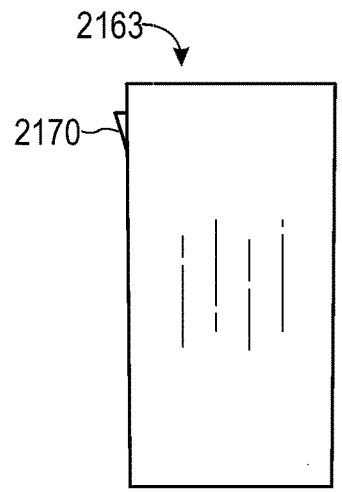
Fig. 31  Fig. 32
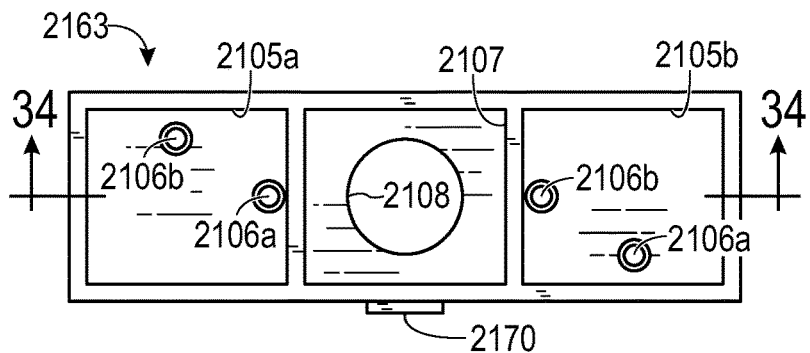
Fig. 33
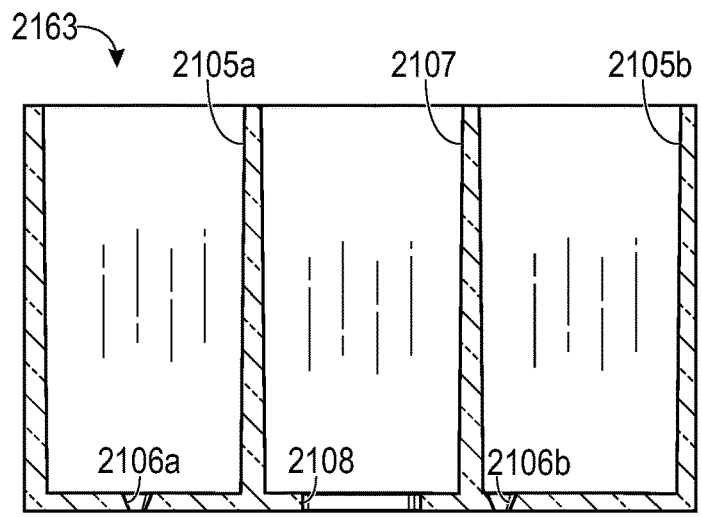
Fig. 34

SYSTEM, METHOD AND DEVICE FOR CULTURE OF A MULTICELLULAR STRUCTURE

RELATED APPLICATION

This application is a National Stage Application of PCT/IB2021/050806 filed on Feb. 1, 2021, which claims priority to U.S. provisional application No. 62/976,151 filed on Feb. 13, 2020, the contents of which are incorporated herein by reference in their entireties. To the extent appropriate, a claim of priority is made to each of the above disclosed applications.

INTRODUCTION

An organoid (a "mini-organ") is a three-dimensional mass of cells of different types produced in vitro and having some resemblance to an organ, such as exhibiting a realistic histology of organ-specific tissue. The mass of cells can be generated by seeding a matrix with a small number of stem cells. The stem cells then proliferate, differentiate, and self-organize within the matrix, while using the matrix as a scaffold. With this approach, organoids resembling tissue from the brain, heart, intestine, kidney, liver, and stomach, among others, have been generated so far. These promising results suggest that organoid culture has the potential to provide new insights into organ development and function, and to recapitulate disease models that allow drug screening in vitro. Organoids may revolutionize how drugs are discovered and medicine is personalized.

Despite the growing importance of organoids, they remain a challenge to culture efficiently. New systems, methods, and devices are needed for culturing organoids and other multicellular structures.

SUMMARY

The present disclosure provides systems, methods, and devices for culturing a multicellular structure, such as an organoid. An exemplary system comprises a vessel, an electric/magnetic module, and a control circuit. The vessel may include a culture chamber to contain a multicellular structure. The electric/magnetic module may be configured to be located in the vessel, at a position in or adjacent the culture chamber. The control circuit may be configured to wirelessly power and/or operate the electric/magnetic module.

BRIEF DESCRIPTION OF THE DRAWINGS

FIG. 31 is a side view of an insert of the culture device of FIG. 21 taken in isolation.

FIG. 32 is an end view of the insert of FIG. 31.

FIG. 33 is a top view of the insert of FIG. 31.

FIG. 34 is a sectional view of the insert of FIG. 31, taken generally along line 34-34 of FIG. 33.

DETAILED DESCRIPTION

Figure 1:
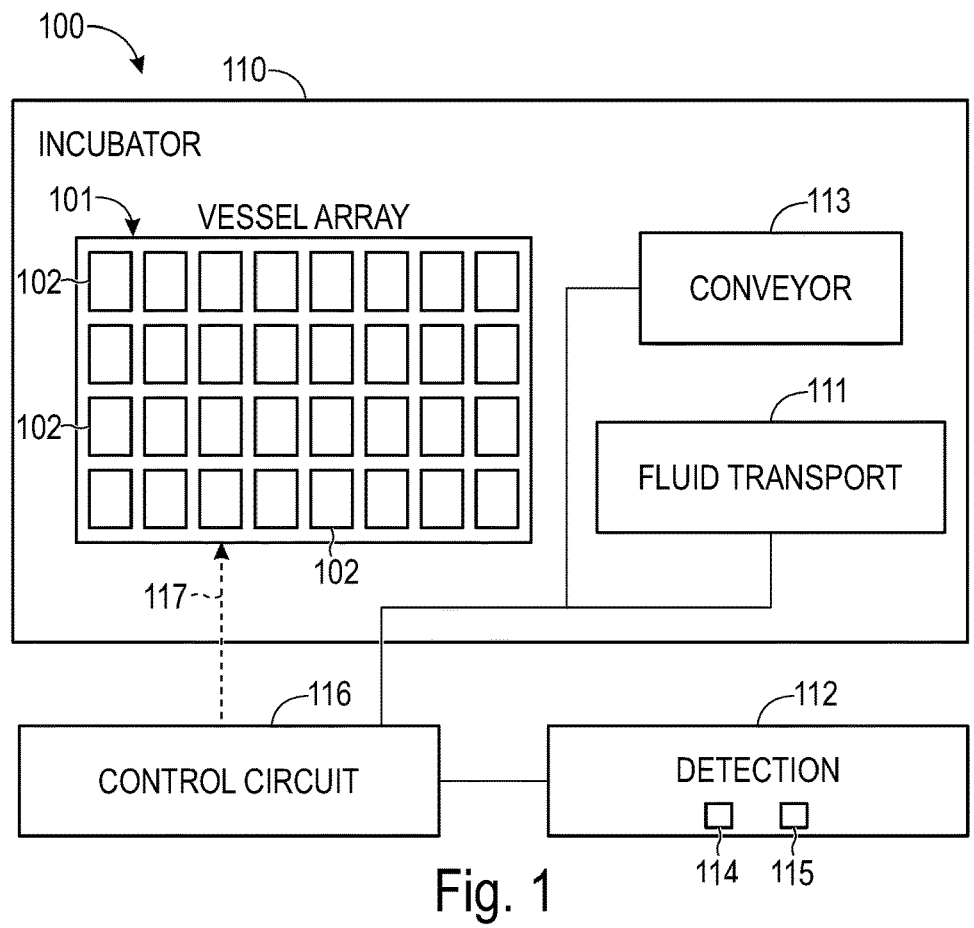
FIG. 1 is a block diagram of an exemplary culture system for forming, growing, feeding, differentiating, stimulating, sensing, testing, and/or imaging multicellular structures, where the culture system includes a vessel array to contain the multicellular structures in respective culture vessels, at least one electric/magnetic module located in at least one culture vessel of the vessel array, and a control circuit to power and/or operate the electric/magnetic module by wireless transmission between the electric/magnetic module and the control circuit.

Culture of large organoids (e.g., up to about 4 mm) is a labor intensive, complex undertaking, which can easily require a few months until the organoids can be harvested or used (e.g., for screening). During culture, the organoids pass through different phases of a culture protocol as they grow, differentiate, and develop. Currently, most of these phases require manual interaction for feeding, monitoring, treatment, etc. Changing labware is often necessary, as a culture vessel containing an organoid may not be suitable for monitoring the state of the developing organoid. Culture protocols that rely on manual interaction are costly and prone to process errors. Moreover, to culture large organoids that develop specific and interacting cell types, it may be essential not only to treat cells with appropriate compounds but also to expose the organoids to a suitable physical environment specific to the type of organoid being cultured. For example, cardiomyocytes as well as neurons need to be stimulated by electrical pulses, while muscle organoids and bone organoids rely on application of alternating mechanical strain. Organoids can be cultured with complex instrumentation that relies on tubing and wiring. However, this instrumentation is bulky, non-standardized, and not readily scaled up for culturing many organoids at the same time.

The present disclosure, in various aspects, addresses the lack of automation, the non-standardized instrumentation, the presence of tubing and wiring, and the non-scalability for organoid culture as currently performed. More specifically, the present disclosure provides vessels, modules, and control circuits that enable automation, improve standardization, avoid tubing and wiring, and allow scalability.

The present disclosure provides a system and a method for culturing a multicellular structure, such as an organoid. The system may comprise a vessel including a culture chamber to contain the multicellular structure. An electric/magnetic module may be configured to be located in the vessel, at a position in or adjacent the culture chamber. A control circuit may be configured to power and/or operate the electric/magnetic module by wireless transmission. In the method, a multicellular structure may be contained in a culture chamber of a vessel. An electric/magnetic module may be located in the vessel, at a position in or adjacent the culture chamber. The electric/magnetic module may be powered/operated using a control circuit via wireless transmission of power, force, and/or signals (e.g., data). The electric/magnetic module may, for example, include a magnet that can be or is moved in the vessel by a magnetic field created by the control circuit, such that the module pumps fluid or mechanically stimulates a multicellular structure contained in the culture chamber. In other examples, the electric/magnetic module may include an electrode to stimulate the multicellular structure, a sensor to sense a property of the multicellular structure and/or a culture medium in the vessel, a light source to illuminate at least a portion of the multicellular structure, and/or the like.

The ability to wirelessly power/operate the electric/magnetic module in the system and method is significant, because it eliminates the need for wires or other electrical conductors extending from the control circuit to the vessel. As a result, the vessel becomes more portable, with fewer restrictions on where it is positioned with respect to the control circuit and is more easily separated from the control circuit (e.g., to perform an imaging procedure). Moreover, this wireless approach may improve the fidelity and stability of experiments with multicellular structures, because it permits the electric/magnetic modules to be positioned in very close proximity to, or in contact with, the multicellular structures under analysis. The system and method also facilitate automation of complex culture of multicellular structures by providing essential physical environments, and may enable multi-channel in-situ monitoring of the multicellular structures. The system and method may be capable of stimulating, maintaining, and monitoring a large number of organoids at the same time in an automated fashion.

The vessel of the present disclosure may be customized, as needed, by introducing one or more active/passive modules into one or more compartments of the vessel. The choice of functional module(s) and compartment(s) in which the module(s) is received allows the vessel to be functionally adapted during manufacture and/or by a user. For example, the choice of module(s) and compartment(s) enables culture of a specific type of organoid, performance of a particular culture protocol or protocol phase, creation of a desired test condition(s), and/or onboard (in the vessel) sensing, measurement, and/or monitoring of a desired parameter(s), among others. Accordingly, the basic structure of the vessel can be standardized, while the vessel's functionality can be modified, as needed, by introduction of different modules to suit the specific needs of various users. Moreover, introduction of the module(s) into the vessel allows the module to be in very close proximity to or in contact with the multicellular structure, which produces a more direct interaction of the module with the multicellular structure. Furthermore, introduction of the module(s) into the vessel may not generate any increase in the size of the footprint. Accordingly, the vessel modified with the module(s) can remain compact, which allows more copies of the vessel to fit in the footprint of a standard microplate, which in turn allows more multicellular structures to be cultured at the same time in an incubator.

A device and a method for culturing a multicellular structure, such as an organoid, are provided. The device may comprise a shell having an open top. The device also may comprise an insert including two or more reservoirs. The insert may be configured to be received in the shell via the open top, such that the shell and the insert cooperatively form a culture chamber for the multicellular structure. The culture chamber may be located under the two or more reservoirs and in fluid communication with each of the two or more reservoirs via respective channels defined by the insert. In the method, an insert including two or more reservoirs may be placed into a shell to form a culture chamber cooperatively using the insert and the shell. The culture chamber may be located under, and in fluid communication with, each reservoir of the two or more reservoirs. The multicellular structure may be cultured in the culture chamber.

The device and method described in the preceding paragraph may offer various advantages for culture of multicellular structures, such as organoids, including any combination of the following. The insert may be selected from a set of inserts having different characteristics from one another, such as different reservoir, channel, and/or slot configurations. Accordingly, the same shell may be assembled with different types of inserts to customize the structure of the resulting vessels for the specific needs of the user. Moreover, the insert may position the reservoirs (and an optional slot) vertically above the culture chamber, such that gravity can drive fluid flow into and/or out of the culture chamber. Furthermore, the shell may define a row of sections each capable of receiving an insert to form a respective culture chamber. Accordingly, the shell and two or more inserts can be assembled to form a vessel assembly having a row of culture chambers. Furthermore, two or more of the vessel assemblies may be held by a frame having a footprint corresponding to that of a standard microplate, to enable formation of a compact array of vessels. Each vessel assembly may be removable individually from the frame, for processing separately from the other vessel assemblies of the array.

The vessel may provide a plurality of reservoirs that are in fluid communication with the chamber via channels, which may be formed in shared wall(s) between the reservoirs and the chamber. This configuration may be described as a standard feeding interface. In some embodiments, 3-D printing provides connection of the standard feeding interface inside the vessel to any suitable printed structure to enable the growth of different types of organoids.

A matrix can provide temporary scaffolding for cells of the appropriate type(s) as they develop into an organoid. The cells may self-organize and produce their own extracellular matrix, which may replace some or all of the scaffolding. The same may be true for internal feeding: the vessel may provide a general interface, which optionally may be modified by 3-D printing, and the cells may organize to best use this modified interface.

In some embodiments, a scaffold (with or without cells) may be disposed in the receptacle of a vessel body, and a culture chamber may be formed from the receptacle using a sealing member, optionally while the vessel is upside down. Once these processes are completed, the vessel may be turned right-side up (to its organoid-culturing orientation), and at least one reservoir overlying the culture chamber may be filled with feeding liquid. If there are not yet any cells inside the scaffold, suitable cells may be placed into the feeding liquid and introduced into the scaffold together with the feeding liquid from a reservoir above the culture chamber.

The forming organoid may need an initial incubation time before a specific feeding protocol can be started. The feeding protocol may involve loading reservoirs with suitable media and removing media from the reservoirs according to a predefined schedule and/or based on the developmental stage or condition of the organoid. The feeding protocol may depend on the shape of the scaffold as well the type of organoid that is to be formed.

The vessel may enable light-sheet 3-D imaging. The culture chamber of the vessel may have two, three, or more optical windows, and light may propagate into and/or out of the culture chamber via each optical window. For example, the vessel may have a bottom window and one or more lateral windows, each of which may be planar. In some embodiments, the vessel may have a pair of lateral optical windows arranged opposite one another.

The present disclosure enables generation of large functional organoids. The large organoids may be greater than about 0.1, 0.2, 0.5, 1, or 2 millimeters, among others, in average diameter or maximum diameter. Working with large organoids is still challenging and researchers are facing two major limitations. First, each type of organoid may need different culture conditions, like specific hydrogels as a scaffold, or even mechanical stimulation like shear force by media flow. Second, microscopy of large organoids can be very challenging. State-of-the-art methods are still thin-sectioning of the organoid material, staining, and image acquisition of fixed samples using confocal point scanning microscopes or even slide readers.

The present disclosure offers systems, methods, and devices for improved organoid culture. By using a combination of 3-D printing (scaffold and/or cells) together with media exchange by gravity flow, a user may generate a unique 3-D environment that is optimized for each type of organoid. A wide range of different organoid types may be grown. Feeding and waste removal may be addressed by fluid communication between the vessel's culture chamber and reservoirs. Integrating optical windows into each vessel, at least one for entry of excitation light, and another for exit of emitted light, allows monitoring living cells of the organoid by light-sheet microscopy.

Alternatively, or in addition, the organoid may be imaged by classical widefield microscopy via one or more of the optical windows. Thus, the vessel disclosed herein may enable performance of live cell microscopy of a developing and/or developed organoid. High-content and/or high-throughput microscopy may be performed on organoids.

Further aspects of the present disclosure are described in the following sections: (I) definitions, (II) culture system and method overview, (III) electric/magnetic modules, (IV) passive modules, (V) vessel assembly, and (VI) selected aspects.

I. DEFINITIONS

Technical terms used in this disclosure have meanings that are commonly recognized by those skilled in the art. However, the following terms may be further defined as follows.

Cell—the basic structural, functional, and biological unit of a living organism. Cells may be eukaryotic or prokaryotic. Exemplary cells include stem cells, differentiated cells, established cells (e.g., cell lines), primary cells, cells of a tissue sample, transfected cells, cells from a clinical sample (e.g., a blood sample, a fluid aspirate, a tissue explant, etc.), cells forming an entire organism, and/or the like.

Any suitable cells may be introduced into a culture chamber (or into a receptacle that will form part of the culture chamber). The introduced cells may include stem cells (e.g., pluripotent stem cells), support cells, and/or the like. The cells may be deposited in the culture chamber or receptacle, and/or in a scaffold located in or to be located in the culture chamber or receptacle, by any suitable technique including pipetting, bioink droplet printing, micro-contact printing, photolithography, dip pen nanolithography, and/or the like.

Cell culture—fostering the survival, health, growth, proliferation, differentiation, and/or self-organization of living cells, such as cells of a multicellular structure, in an artificial environment.

Culture chamber—a compartment for containing a multicellular structure and having walls on substantially all sides of a mostly or completely enclosed space. At least one of the walls may define one or more openings to permit communication with, and/or passage into and/or out of, the compartment.

Culture medium—an aqueous composition for cell culture. The composition may be liquid or semi-solid. The composition may include a carbon source (e.g., glucose), inorganic salts, vitamins, and growth regulators, among others. The term "media," as used herein, means at least one medium, and may, for example, refer to separate volumes of a medium, a first medium and a second medium of different compositions, a medium of substantially the same composition in contact with different/separate cell cultures, or a combination/mixture of previously isolated volumes of the same medium.

Culture vessel—a device for culture of a multicellular structure. A culture vessel (interchangeably called a vessel) may include a culture chamber and one or more reservoirs in fluid communication with the culture chamber. A vessel assembly or vessel array is a collection of culture vessels for culture of a one-, two-, or three-dimensional arrangement of multicellular structures. The culture vessels disclosed herein may be single-use devices (consumables) or may be re-used.

Exemplary—illustrative or serving as an example. Similarly, the term "exemplify" means to illustrate by giving an example. Neither term implies desirability or superiority.

In—when describing the location/position of an object with respect to a given structure, "in" or "inside" means that the object is present at least predominantly (more than 50% of the object's volume) or completely inside the given structure. In the same context, "outside" means that the object is present at least predominantly (more than 50% of the object's volume) or completely outside the given structure.

Light—optical radiation including ultraviolet radiation, visible radiation (i.e., visible light), and/or infrared radiation.

Module—a structurally and functionally discrete unit configured to be contained in a culture vessel. A module may be insertable into and/or removable from a culture vessel, while the culture vessel remains intact, or only when the culture vessel is disassembled, or may be configured to be nonremovable from the culture vessel. A module may be an active module, also called an electric/magnetic module, which is a module that utilizes electricity and/or magnetism for operation, and optionally is powered/operated by wireless transmission between a control circuit and the module. Alternatively, a module may be a passive module, which is a module that utilizes neither electricity nor magnetism to serve its intended purpose(s). Electric/magnetic modules include magnetic modules comprising a permanent magnet but no electric/electronic device, electric modules comprising an electric/electronic device but no permanent magnet, and modules comprising a permanent magnet and an electric/electronic device. A magnetic module may require an externally generated, optionally time-varying, magnetic field for operation (such as to drive movement of the magnetic module and/or a magnet thereof).

A module may have any suitable shape and size. The module, and particularly a housing or body thereof, may, for example, be cuboidal (e.g., cubical), cylindrical, conical, or the like. The shape of the module in cross-section may correspond to that of a slot or other compartment of the vessel, such that the module fits into the slot or other compartment. To provide flexibility and interchangeability, it may be advantageous to have the same standard shape and size for all modules configured to be placed into a given compartment of a vessel (e.g., a slot thereof), or the same standard size and shape for all modules irrespective of compartment destination. $4 \times 4 \times 4$ mm$^3$ is an exemplary size of active and passive modules, which corresponds to the size of a large organoid that may be generated in a culture chamber of a vessel.

Multicellular structure—a three-dimensional arrangement of biological cells that are connected to one another. The multicellular structure may be an organized multicellular structure, which is a multicellular structure composed of different cell types arranged nonrandomly relative to one another. Exemplary multicellular structures include organoids, organisms (at any developmental stage), tissue explants, tumors, or the like.

Near field communication (NFC)—wireless communication between electronic devices using near field radiation and inductive coupling or capacitive coupling. Near field communication may be performed when the electronic devices are less than 50, 20, 10, or 5 centimeters from one another, among others.

Near field radiation—electromagnetic radiation, typically radiowaves (e.g., microwaves), at a position within 10, 5, or 2 wavelengths from the radiation source, such as within 50, 20, 10, or 5 centimeters from the radiation source.

Organoid—a three-dimensional aggregate of cells of different types produced in vitro and having some resemblance to an organ, such as exhibiting a realistic histology of organ-specific tissue. The aggregate of cells may be generated by seeding a scaffold (i.e., a matrix) with a small number of stem cells. The stem cells then proliferate, differentiate, and self-organize within the scaffold.

Receptacle—a container, optionally having an open side, such as an open top side, an open bottom side, or an open lateral side. A receptacle may be converted to a culture chamber by at least partially covering or closing a side of the receptacle.

Scaffold—an extracellular supporting framework for culture of a multicellular structure. The scaffold is typically a matrix in which cells of the multicellular structure are or will be embedded. A scaffold may be provided by one or more hydrogels. Each hydrogel may include one or more thermoplastic structural components, such as Matrigel, alginate, nanofibrillar cellulose, collagen, fibrin, and/or polyethylene glycol, among others, that cooperatively form a matrix in a temperature-dependent fashion.

In some embodiments, two or more different hydrogels/ matrices may be disposed in a culture chamber of a vessel. The hydrogels/matrices may differ for any suitable parameters, such as melting temperature, resistance to enzyme degradation, solubility, cell-attraction and/or cell-repulsion characteristics, and/or the like.

Each hydrogel/matrix may include any suitable components. Exemplary components include one or more polysaccharides (e.g., glycosaminoglycans (GAGs, such as chondroitin sulfate, dermatan sulfate, heparin, heparan sulfate, hyaluronic acid, keratan sulfate, etc.), proteoglycans (e.g., GAGs linked to a core protein (such as via serines thereof) to form aggrecan, agrin, brevican, collagen type XVIII, leprecan, neurocan, perlecan, small leucine-rich proteoglycans, versican, or the like), fibrous proteins (e.g., collagen, elastin, fibronectin, laminin, etc.), and/or the like. Protease recognition sites (e.g., for a scaffold metalloproteinase (MMP)) may be incorporated into the hydrogel/matrix to allow degradation/remodeling by cells. The frequency of such sites, along with the sequence of each site may be selected to permit a suitable amount of degradation/remodeling.

One or more growth factors may be included in the matrix when formed, or may be introduced in a culture medium after formation of the matrix. Exemplary growth factors that may be suitable include angiopoietin, bone morphogenetic proteins (BMPs), ciliary neurotropic factor, colony stimulating factors, ephrins, epidermal growth factor, erythropoietin, fibroblast growth factors, glial-derived neurotrophic factor, hepatocyte growth factor, insulin, insulin-like growth factors, interleukins, leukemia inhibitory factor, keratinocyte growth factor, neuregulins, neurotrophins, plateletderived growth factor, transforming growth factors, tumor necrosis factor (alpha), vascular endothelial growth factor, and/or the like.

II. CULTURE SYSTEM AND METHOD OVERVIEW

This section provides an overview of the culture systems and methods of the present disclosure; see FIGS. 1-7.

FIG. 1 shows an exemplary culture system 100 for forming, growing, differentiating, organizing, stimulating, sensing, analyzing, and/or imaging multicellular structures, such as organoids. Culture system 100 comprises a vessel array 101 including a set of culture vessels 102, only three of which are identified expressly in FIG. 1. Each culture vessel 102 is configured to contain a respective multicellular structure. Vessel array 101 can be or include a linear array, a two-dimensional array (e.g., a rectangular array, as shown, a hexagonal array, etc.), and/or a three-dimensional array. Vessel array 101, and/or each of two or more discrete vessel assemblies thereof, may have a footprint corresponding to the length and/or width of a standard microplate, to facilitate mechanical and fluidic handling with robotic systems that are designed for manipulating standard microplates. The number of culture vessels 102 in vessel array 101 may be at least three in a first dimension, and one or more (e.g., at least two, three, or more) in a second, orthogonal dimension.

Figure 1A:
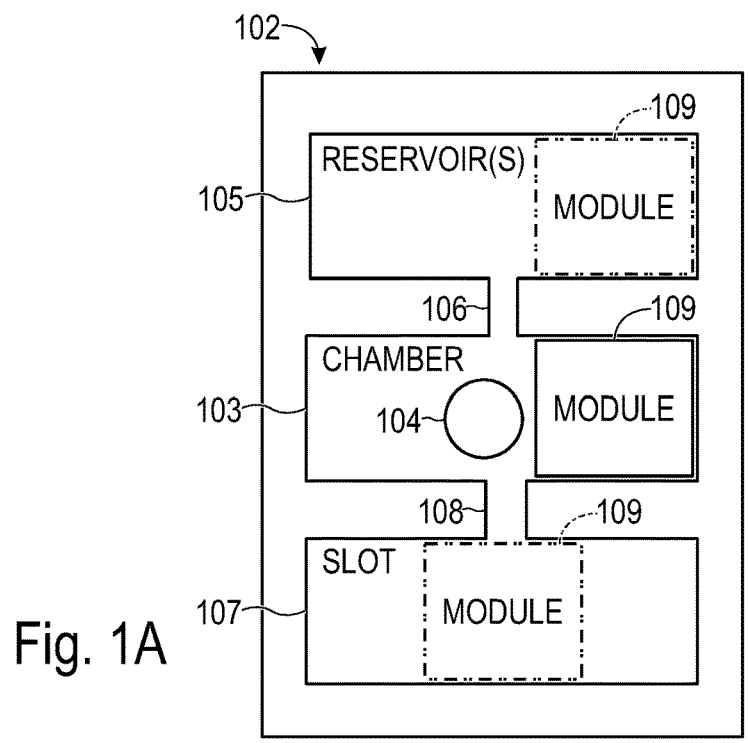
FIG. 1A is a schematic view of an exemplary culture vessel of the vessel array of FIG. 1.

Each culture vessel 102 of vessel array 101 may include two or more distinct compartments, which may or may not be in fluid communication with one another and may or may not share one or more walls with one another (see FIG. 1A). Culture vessel 102 has a culture chamber 103 to contain a multicellular structure 104, such as an organoid. At least one reservoir 105 of vessel 102 is configured to hold a culture medium. Each reservoir 105 is arranged in fluid communication with culture chamber 103 via at least one respective connecting channel 106. Vessel 102 also may have at least one slot 107, which may communicate with culture chamber 103 via an aperture 108.

Each compartment of culture vessel 102 may have any suitable size and shape. Culture chamber 103 may have a volume of at least 0.1, 0.2, 0.3, 0.4, 0.5, 0.7, or 1 mL. The culture chamber may be sized to contain a multicellular structure, such as an organoid, of any suitable size, such as a multicellular structure having a diameter of at least 0.2, 0.5, 1, or 2 mm, among others. In exemplary embodiments, each reservoir 105 of culture vessel 102 has a greater capacity than culture chamber 103, such as a volume at least 2, 5, or 10 times the volume of the culture chamber, and/or at least 0.5, 1, 2, 4, or 6 mL, among others. Slot 107 may have a volume that is greater than, less than, or the same as culture chamber 103 or one or more reservoirs 105, and/or may have the same height as each reservoir 105. Each compartment of the vessel may be rectangular, circular, elliptical, or the like, in horizontal cross-section. A rectangular cross-section for each of the vessel's compartments may be advantageous because this shape makes very efficient use of the available space and allows culture vessels 102 to be arranged very close to one another in vessel array 101.

Culture vessel 102 may be formed of any suitable material (s) by any suitable procedures. In exemplary embodiments, the culture vessel may be composed of at least one polymer, which may include a transparent polymer. Culture vessel 102 may be formed integrally as a single piece or by at least a pair of discrete components, such as a shell and an insert, or a body and a sealing member, that are fitted together and/or attached to one another to form culture chamber 103. Accordingly, culture chamber 103, reservoirs 105, and/or slot 107 may have fixed positions relative to one another and/or may be nonremovably/firmly attached to one another in culture vessel 102.

A reservoir(s) 105 of vessel 102 may hold any suitable substances to be supplied to culture chamber 103. Exemplary substances include nutrients, effectors, and reagents, among others. Suitable nutrients include any substances to facilitate the health and proliferation of cells, and thus growth and development of a multicellular structure, such as an organoid, inside culture chamber 103. Exemplary nutrients may include sugars (such as glucose), amino acids, proteins, nucleotides, vitamins, minerals, fatty acids, etc. Effectors include any molecules (such as inducers or repressors) that activate, control, or inactivate a process or action (such as differentiation, protein synthesis, migration, etc.). Exemplary effectors include anti-cancer compounds, growth factors, differentiation factors, oligonucleotides, mRNAs, or the like. Reagents include any compounds that facilitate analysis of a multicellular structure such as an organoid. Exemplary reagents include labels, fixation agents, and clearing agents, among others. The labels may include dyes (e.g., visible stains and/or photoluminescent dyes). Photoluminescent dyes are any substances that emit light in response to irradiation with electromagnetic radiation, such as excitation light.

Each reservoir 105 may have an open top to facilitate introduction and removal of fluid with a fluid-transfer device (e.g., a pipet). A lid may be provided for placement onto culture vessel 102 to cover an open top of each reservoir 105 during incubation in an incubator. The lid may have a flange configured to vertically overlap an upper region of each reservoir and restrict lateral motion of the lid when covering the reservoir(s), optionally without creating a tight fit. In some embodiments, the lid may be a cap that forms a fluid-tight seal at the top of one or more reservoirs 105.

Vessel 102 may contain at least one module 109 in one or more of the vessel's compartments. FIG. 1A shows a module 109 located in culture chamber 103, with possible alternative positions for the same module shown in phantom outline. More specifically, each module 109 may be located in culture chamber 103, a reservoir 105, or slot 107, among others. Accordingly, each module 109 may be located in or adjacent culture chamber 103. Each module 109 may be contained in culture vessel 102, or may be present in a set of functionally different modules 109 located outside culture vessel 102 and configured to be selectively placed into culture vessel 102 by a user. Each module 109 independently may be an active, electric/magnetic module (e.g., an electrode module, an actuator module, a sensor module, a pump module, and/or an illumination (light-emitting) module, among others) or a passive module (e.g., a permeable-interface module, a scaffold module, or a dummy module), as described further below.

Culture system 100 also may comprise an incubator 110 to contain vessel array 101 (see FIG. 1). The incubator may be temperature-controlled to a suitable culture temperature for multicellular structure 104, such as at least 25° C., 30° C., or 35° C., among others (also see FIG. 1A). The humidity and/or atmosphere inside incubator 110 also may be controlled to encourage growth and development of multicellular structure 104.

Culture system 100 further may comprise a fluid transport system 111, a detection system 112, and a conveyor 113, each of which may be located inside or outside incubator 110. Fluid transport system 111 is configured to add liquid to and/or remove liquid from, each culture vessel 102 of vessel array 101, such as into and/or out of each reservoir 105 thereof. The fluid transport system thus may include one or more pipettes, fluid supplies, and/or waste containers. Detection system 112 is configured to collect data, such as by optical detection, related to multicellular structures contained by vessel array 101. For example, detection system 112 may include a light source 114 to irradiate at least part of a multicellular structure in each culture vessel 102, and an image sensor 115 to capture an image of at least a portion of the multicellular structure. Conveyor 113 may be configured to move components of culture system 100 relative to one another. For example, conveyor 113 may be configured to move vessel array 101 as a unit, or only a portion thereof within culture system 100. For example, conveyor 113 may be configured to move vessel array 101 or culture vessels 102 thereof, into and/or out of incubator 110, to and/or from fluid transport system 111, and/or to and/or from detection system 112. Alternatively, or in addition, conveyor 113 may be configured to remove and replace one or more lids, if any, covering vessel array 101, when reservoirs 105 and/or slot 107 is being accessed.

A control circuit 116 of culture system 100 powers and/or operates any suitable devices of the culture system. For example, control circuit 116 may control each of fluid transport system 111, detection system 112, and/or conveyor 113 via wired or wireless communication, which may be one-way or two-way communication. Each module 109 held by vessel array 101 also may be wirelessly controlled by control circuit 116, indicated by a dashed arrow at 117. This wireless control is advantageous because it simplifies construction of vessel array 101, allows the vessel array to be functionally customized as needed by introducing appropriate modules, and eliminates the need for wires or electrical conductors extending into the culture vessel and providing a path for contamination with microorganisms.

Figure 2:
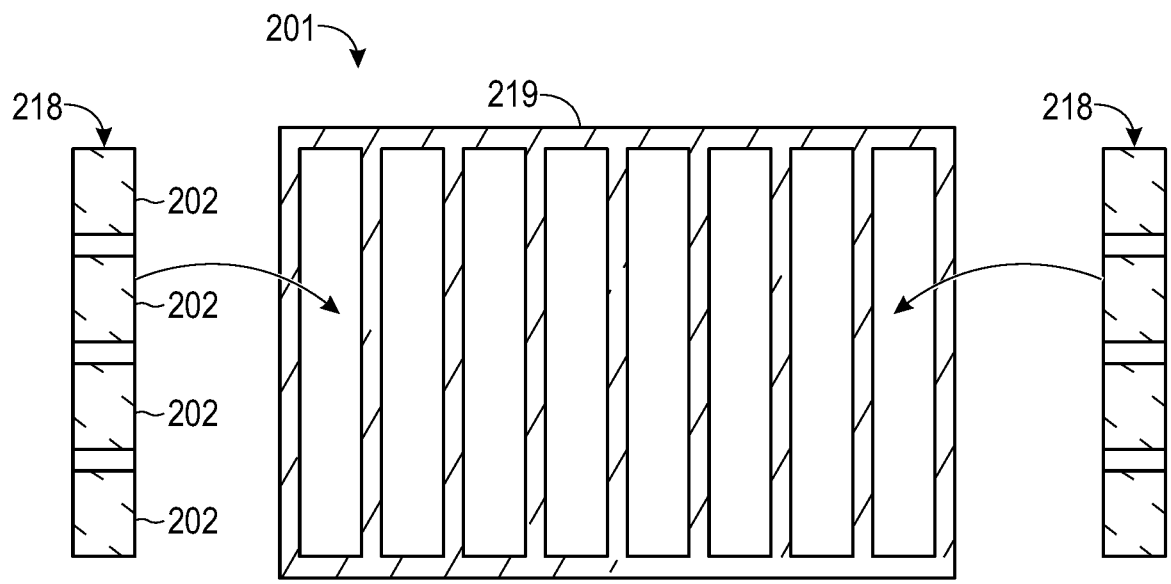
FIG. 2 is an exploded, schematic top view of an embodiment of the vessel array of FIG. 1.

FIG. 2 shows an exemplary vessel array 201 for culture system 100 of FIG. 1. The vessel array comprises a plurality of vessel strips 218 (interchangeably called vessel assemblies) each including a row of culture vessels 202 that are attached to one another, e.g., via a common (shared) housing. The vessel strip may have any suitable number of culture vessels 202, such as at least two, three, four, or more. Each vessel strip 218 is received and held by a frame 219, optionally to form a row of vessel strips 218. Each vessel strip 218 may be placed, as a unit, into a respective receiving site of frame 219, for example, during manufacture or by a user. In the depicted embodiment, frame 219 has a row of eight receiving sites to receive a corresponding number of vessel strips 218, but in other embodiments the frame may be configured to receive at least two, three, or more vessel strips 218 in a corresponding number of receiving sites. Each vessel strip 218 may be removable from frame 219 individually to permit manipulation, processing, and/or analysis of the vessel strip (and/or contents therein) separately from other vessel strips 218 of vessel array 201.

Figure 3:
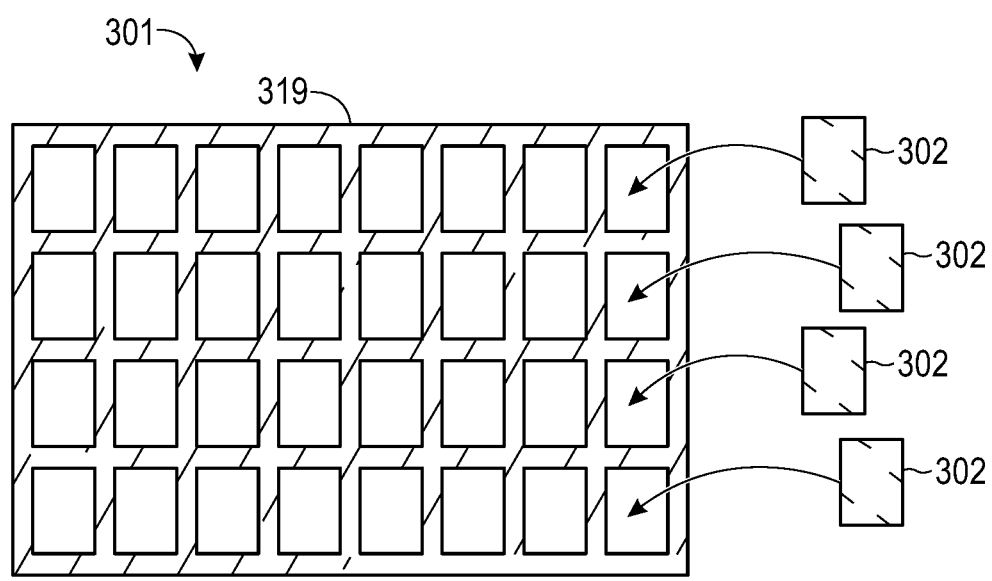
FIG. 3 is an exploded, schematic top view of another embodiment of the vessel array of FIG. 1.

FIG. 3 shows another exemplary vessel array 301 for culture system 100 of FIG. 1. The vessel array comprises a plurality of separate, individual culture vessels 302 that are received and held by a frame 319. Each culture vessel 302 may be placed into a respective opening of frame 319, for example, during manufacture or by a user. The culture vessel may or may not be removable from the frame.

Figure 4:
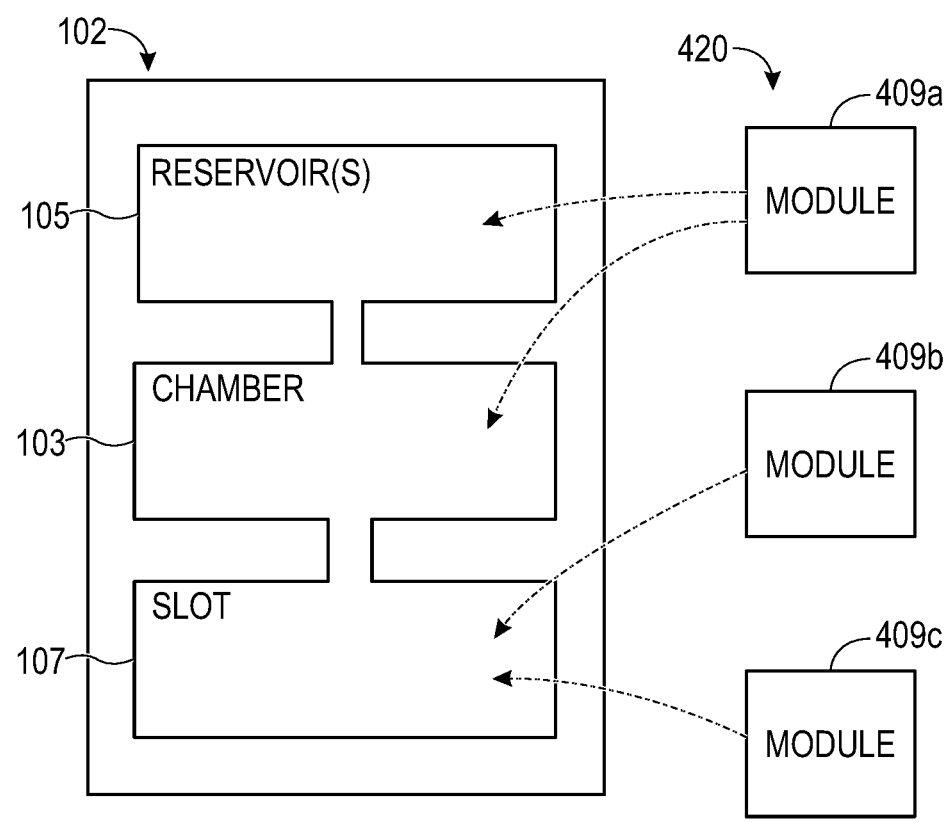
FIG. 4 is a schematic view of the culture vessel of FIG. 1A and a set of functionally different modules for use in the culture vessel.

FIG. 4 shows culture vessel 102 of FIG. 1A and a module set 420 of functionally different modules 409a-409c that may be contained in culture vessel 102. Module set 420 may be composed of any suitable number of functionally different modules, such as at least 2, 3, 4, or more. Each module of module set 420 may have any suitable combination of characteristics, as described above for module 109, or elsewhere herein (such as in Sections I, III, IV, and VI). Two or more modules of module set 420 may be interchangeably positionable in culture vessel 102 relative to one another, such as in the same compartment thereof, as illustrated with phantom arrows for placement of modules 409b and 409c in slot 107, and/or at least one module of module set 420 may be interchangeably positionable in each of two or more compartments of culture vessel 102, as illustrated with a pair of phantom arrows for module 409a in culture chamber 103 or a reservoir 105.

Figure 5:
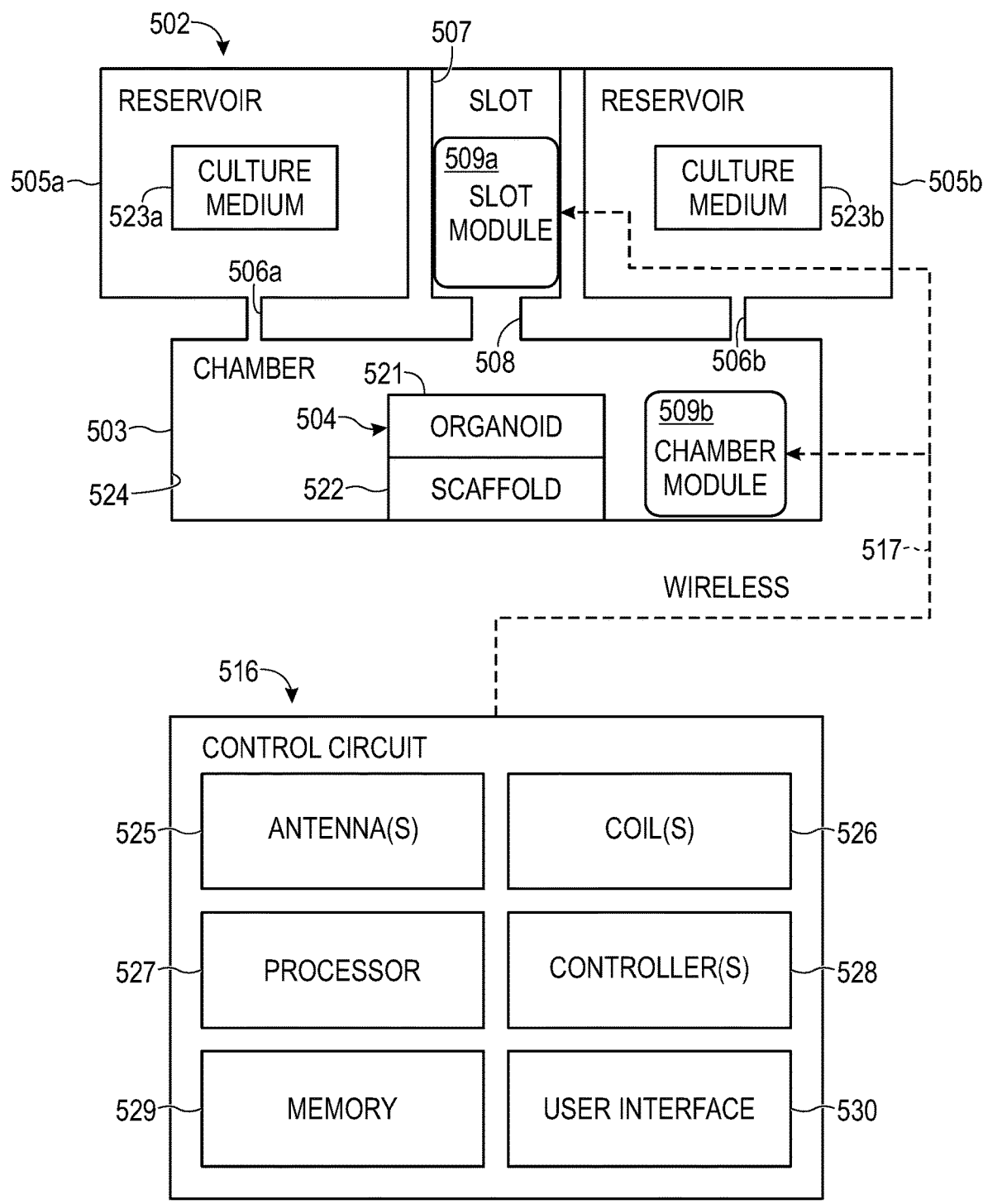
FIG. 5 is a block diagram of exemplary embodiments of a culture vessel and a control circuit for the culture system of FIG. 1, with the culture vessel shown in a schematic side view.

FIG. 5 shows an exemplary culture vessel 502 and an exemplary control circuit 516 for culture system 100 of FIG. 1. Culture vessel 502 is shown in a schematic side view and includes a culture chamber 503 containing a multicellular structure 504, namely, an organoid 521 and an associated scaffold 522 to support formation and/or growth of the organoid. Scaffold 522 is attached to a bottom wall of culture chamber 503 in FIG. 5, but in other embodiments may be attached to any suitable lateral wall(s) or a top wall of the culture chamber. At least a pair of reservoirs 505*a*, 505*b* are located over culture chamber 503 and communicate with the culture chamber via respective channels 506*a*, 506*b*. Each reservoir may be "vertically above" the culture chamber, meaning that a vertical line extends through the reservoir and the culture chamber. Each reservoir 505*a*, 505*b* holds a respective culture medium 523*a*, 523*b*, which may have the same or different compositions from one another. Culture chamber 503 also holds a culture medium, which may be supplied at least in part by one or both reservoirs 505*a*, 505*b* via one or both channels 506*a*, 506*b*.

Culture vessel 502 optionally defines a slot 507 located over culture chamber 503. Slot 507 may be described as an access slot because the slot may communicate at its bottom end with culture chamber 503 via an aperture 508. Aperture 508 may (or may not) have a diameter that is greater than that of each channel 506*a*, 506*b*, such at least 50% or 100% greater. Slot 507 is configured to receive a slot module 509*a*, which may be placed into slot 507 of culture vessel 502 during manufacture or by a user. In some cases, the user may choose a slot module 509*a* for placement into slot 507 from a set of functionally different slot modules (e.g., see FIG. 4). The ability to interchange slot modules of different function enables culture vessel 502 to be adapted to different culture/testing regimes for various types of organoids or other multicellular structures. In some cases, a dummy module may be placed into slot 507 to cover aperture 508, if a slot module is not being used in the slot.

Slot 507 may have any suitable position with respect to culture chamber 503 and reservoirs 505*a*, 505*b*. The slot may be located centrally between the reservoirs, as shown, or may have a lateral position with respect to the reservoirs.

Slot 507 and reservoirs 505*a*, 505*b* may be open at the top ends thereof. This configuration allows placement of slot module 509*a* into slot 507 and dispensing of a culture medium 523*a*, 523*b* into one or both reservoirs. Accordingly, vessel 502 may include a removable lid to cover an open top of slot 507 and/or reservoirs 505*a*, 505*b*. Further aspects of lids for culture vessels and vessel assemblies are described below in Section V.

Culture chamber 503 may contain at least one chamber module 509*b*. The chamber module may be placed into a receptacle 524, such via a top side, bottom side, or lateral side thereof, and the receptacle 524 may be converted to culture chamber 503 by at least partially closing the top side, bottom side, or lateral side of the receptacle. In some cases, if chamber module 509*b* is large enough, the chamber module may be trapped in culture chamber 503 unless and until the culture chamber is opened and/or disassembled by removing a wall portion thereof.

Control circuit 516 is configured to control slot module 509*a* and/or chamber module 509*b* wirelessly, indicated at 517, if either or both is an electric/magnetic module (see Section III). The control circuit may include one or more antennas 525 to transmit/receive power and/or data, to each module 509*a*, 509*b*, if any, that is an electric module, using near field radiation. One or more coils 526 of the control circuit may be utilized to generate a magnetic field to drive movement of at least a magnetic portion, if any, of each module 509*a*, 509*b*. Control circuit 516 also may comprise a computer including a processor 527, one or more controllers 528, memory storage 529, and/or a user interface 530 (e.g., a display, keyboard, mouse, printer, and/or the like).

Control circuit 516 may be configured to control movement and/or operation of one or more electric/magnetic modules contained in each culture vessel of an array of culture vessels. Accordingly, the control circuit may have at least one respective antenna 525 and/or at least respective coil 526 for each culture vessel of the array.

Figure 6:
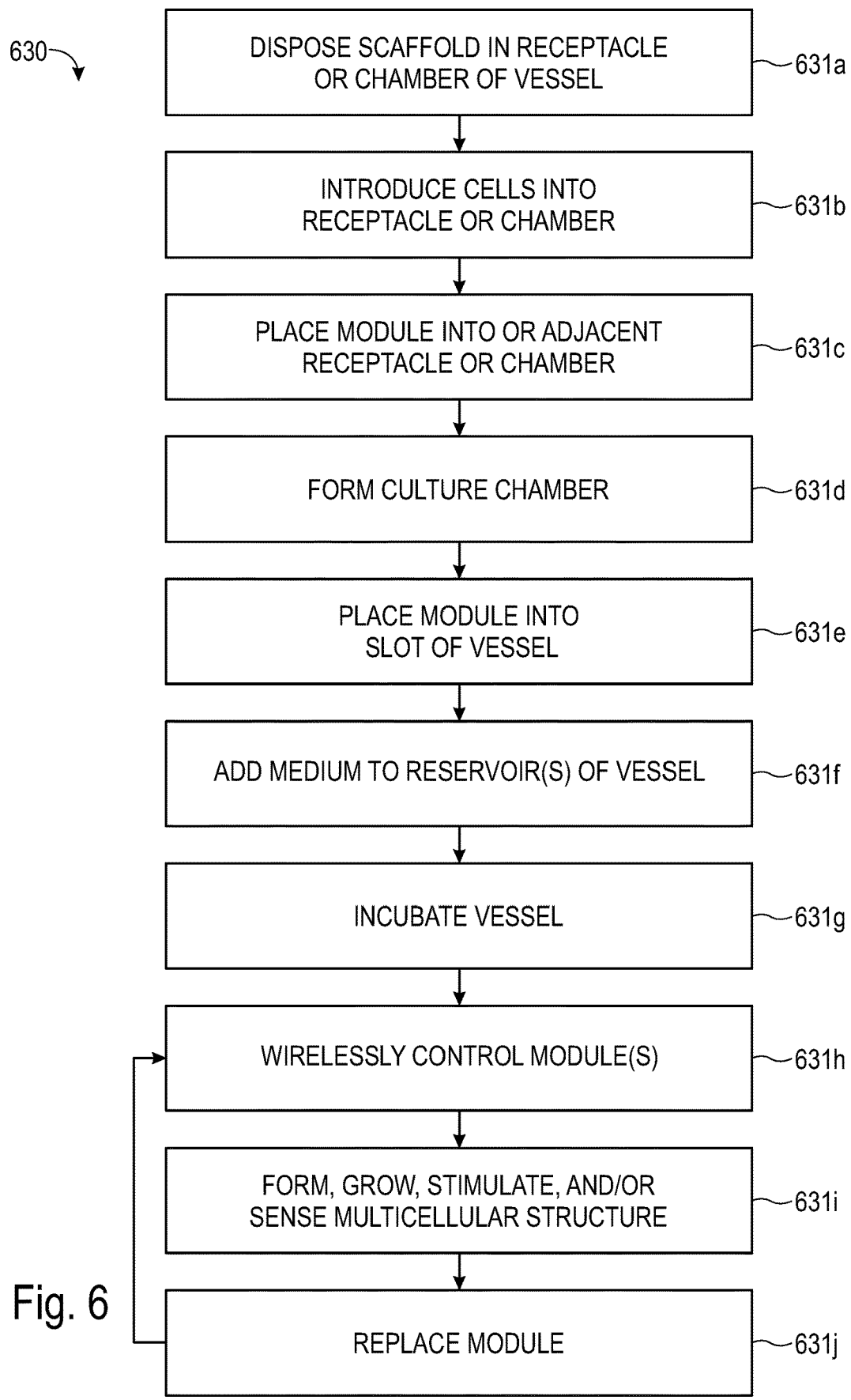
FIG. 6 is a flowchart of exemplary steps that may be performed in a method of culturing a multicellular structure.

FIG. 6 is a flowchart 630 of exemplary steps, 631*a*-631*j*, which may be performed in any suitable order and combination, to provide a method of culturing a multicellular structure. The method may be performed using any suitable systems, devices, cells, and scaffolds of the present disclosure.

A scaffold may be disposed in a receptacle or culture chamber of a culture vessel, at step 631*a*. The scaffold may be disposed by forming the scaffold in the receptacle or culture chamber, such as by 3-D printing, or by placing a pre-formed scaffold into the receptacle or culture chamber. In some examples, the scaffold may be attached to a scaffold module, which may be placed into a slot of the culture vessel, before or after the culture chamber is formed.

Cells may be introduced into the receptacle or culture chamber of the culture vessel, at step 631*b*. The cells may include stem cells, which are intended to generate an organized multicellular structure by differentiation, division, migration, etc. In other cases, the cells may be introduced into the receptacle or culture chamber as a pre-formed multicellular structure (e.g., an organism, a tissue explant, a tumor, an organoid, or the like). The cells may be introduced during step 631*a* or may be introduced before or after step 631*a*.

One or more modules may be placed into or adjacent the receptacle or culture chamber, at step 631*c*. Any combination of modules, as disclosed herein, may be placed. Any suitable number of the one or more modules may be placed during manufacture of the vessel and/or by a user.

A culture chamber of the culture vessel may be formed, at step 631*d*. The culture chamber may be formed using the receptacle, which may have an open side, by at least partially closing the open side. For example, the open side may be covered by bonding a sealing member to the receptacle at the open side (e.g., to an open bottom side of the receptacle) or by placing an insert into a shell that includes the receptacle. In each case, the chamber may be formed cooperatively using the receptacle and the sealing member or insert.

A module may be placed into a slot of the vessel, at step 631*e*. The module may be placed before or after step 631*d*. In some cases, steps 631*a* and 631*e* may be performed together using a scaffold module including a pre-formed scaffold. In some cases, steps 631*b* and 631*e* may be performed together using a module including cells.

A culture medium may be added to one or more reservoirs of the culture vessel, at step 631*f*. The culture medium, once added, may flow from one of the reservoirs into the culture chamber, optionally driven by gravity. The force of gravity also may drive flow of culture medium out of the culture chamber and into a different reservoir of the culture vessel.

The vessel and its contents may be incubated, at step 631*g*. Incubation may be performed at a suitable temperature and in a suitable gaseous atmosphere, and for any suitable length of time, such as at least 1, 2, 3, 4, or 5 days, or at least 1, 2, or 3 weeks, among others.

Each electric/magnetic module, if any, in the culture vessel may be wirelessly controlled by a control circuit, at step 631*h*. This control may include transmitting power, force, and/or data to the module, to drive movement of the module, or at least a portion thereof, and/or to control operation of the module. Steps 631g and 631h may be performed at the same time.

A multicellular structure may be formed, grown, stimulated, and/or sensed in the culture chamber, at step 631i. Step 631i may be performed in response to steps 631g and/or 631h.

A first module contained by the vessel may be removed and replaced by a second module, at 631j. The first module may be removed from a slot of the vessel and replaced by the second module in the same slot. The first and second modules may be functionally different from one another. After replacement of the first module with the second module, steps 631h and 631i may be repeated.

Figure 7:
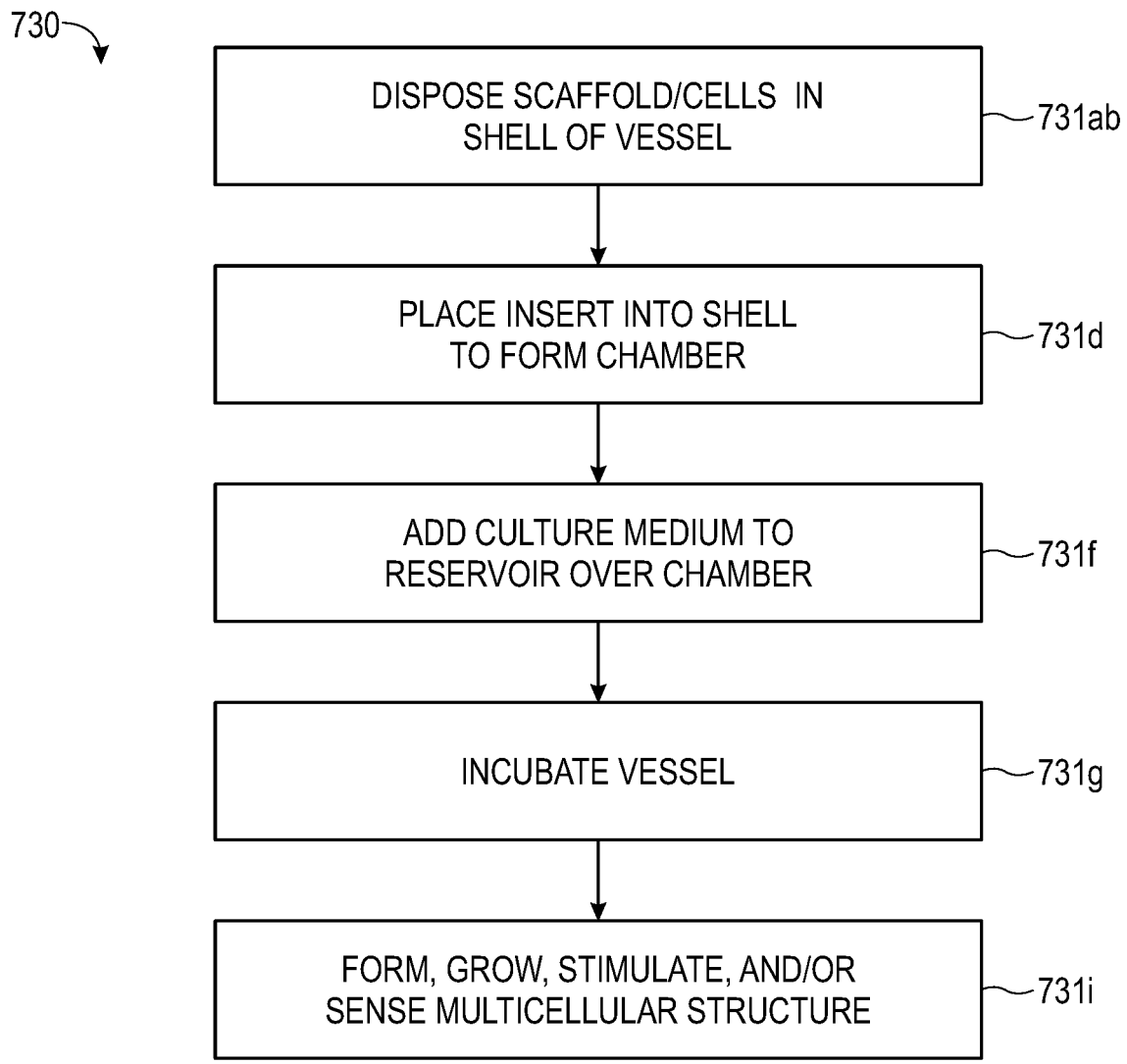
FIG. 7 is a flowchart of exemplary steps that may be performed in a method of culturing a multicellular structure using a culture vessel including a shell and an insert.

FIG. 7 is a flowchart 730 of exemplary steps, 731ab, 731d, 731f, 731g, and 731i, which may be performed in any suitable order and combination, optionally with the addition of one or more steps from flowchart 630 of FIG. 6, to provide a method of culturing a multicellular structure. The method may be performed using any suitable systems, devices, cells, and scaffolds of the present disclosure. Steps of flowchart 730 that correspond to those of flowchart 630 have the same letter designation in both flowcharts.

A scaffold and/or cells may be disposed in a shell of a vessel, at step 731ab. More specifically, the scaffold and/or cells may be disposed in a receptacle formed by a portion of the shell.

An insert of the vessel may be placed into the shell to form a culture chamber, at step 731d. The culture chamber may be formed cooperatively by the receptacle and the shell. The receptacle may provide a bottom wall and lateral walls of the chamber, and the insert may provide a top wall of the culture chamber. Step 731d may be performed before or after the scaffold and/or the cells are disposed in the receptacle.

Culture medium may be added to at least one reservoir over (e.g., vertically above) the culture chamber, at step 731f. The insert may provide the at least one reservoir or each reservoir over the culture chamber.

The culture vessel and its contents may be incubated, at step 731g. Incubation may be performed at a suitable temperature and in a suitable gaseous atmosphere, and for any suitable length of time, as described above for step 631g (see FIG. 6).

The methods of FIGS. 6 and 7 may be performed with an array of culture vessels. Accordingly, each step of the method may be performed on the culture vessels of the array as a group or individually on the culture vessels, as appropriate.

III. ELECTRIC/MAGNETIC MODULES

This section describes exemplary electric/magnetic modules for use in the culture systems and methods of the present disclosure; see FIGS. 8-17. Each electric/magnetic module is configured to be wirelessly powered/operated by a control circuit while the module is located in a culture vessel. The electric/magnetic module utilizes electricity, magnetism, or a combination thereof, supplied or applied wirelessly by the control circuit to the module, to drive movement of at least a portion of the module with respect to the vessel and/or operation of at least one electric/electronic device of the module. The module may be configured to be contained in any culture vessel of the present disclosure, and in any compartment(s) thereof, such as a slot, a reservoir(s), and/or a culture chamber of the culture vessel.

Figure 8:
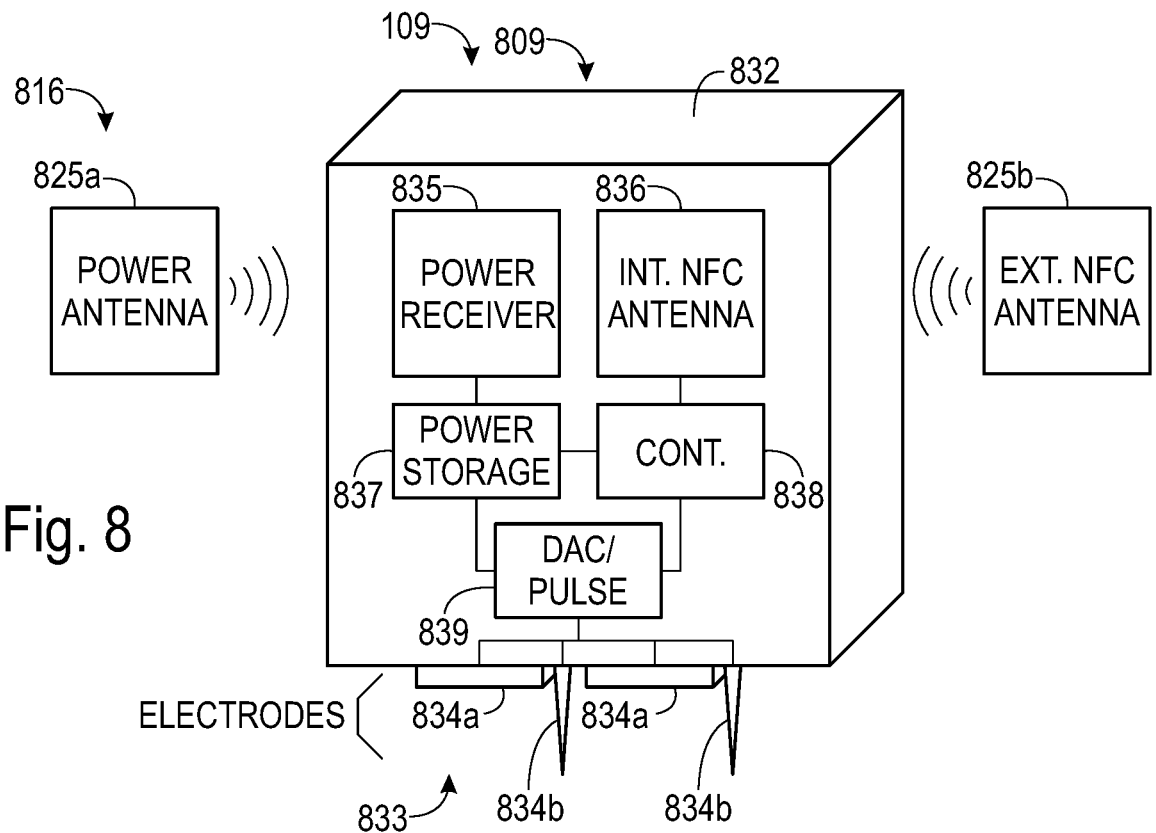
FIG. 8 is a somewhat schematic view of an exemplary electrode module for use in the vessels of FIG. 1 or the method of FIG. 6, along with power and communication antennas of a control circuit configured to power and operate the electrode module.

FIG. 8 shows an exemplary electrode module 809 (i.e., an electric/magnetic embodiment of module 109), and also shows a power antenna 825a and a communication antenna 825b of a control circuit 816. Antennas 825a, 825b are respectively configured to transmit power to and operate electrode module 809.

Electrode module 809 comprises a housing 832 supporting an electrode interface 833. The electrode interface may be located on any suitable side of housing 832, such as a bottom side, as shown, or a lateral side thereof (e.g., if electrode module 809 is contained in a culture chamber), among others. Electrode interface 833 may include any suitable number of electrodes of any suitable shape. For example, the electrode interface may have a pair of plate electrodes 834a, which may be configured to touch a surface of a multicellular structure in a culture chamber, and/or a pair of pin electrodes 834b, which may be configured to penetrate and extend into the multicellular structure. Electrode interface 833 may be used to electrically stimulate the multicellular structure and/or to sense an electric characteristic of the multicellular structure externally or internally. Exemplary uses for electrode module 809 include electrically stimulating (a) cardiomyocytes or neurons for pacing or activation, (b) myoblasts to promote muscle differentiation and growth in three dimensions, or (c) neural tissue (e.g., a brain organoid) to promote axon growth and morphology changes to affect networking, among others. Other exemplary uses for electrode module 809 include sensing electric activity of any suitable cells/tissue, such as neurons, smooth muscle, cardiomyocytes, or skeletal muscle.

Housing 832 may contain any suitable electronic circuitry to enable wirelessly powering, communicating with, and/or controlling electrode module 809. This circuitry may include a power receiver 835 having an antenna to receive power transmitted wirelessly from power antenna 825a of control circuit 816. The circuitry also may include an internal communication antenna 836 to receive signals from, and/or send signals to, external communication antenna 825b of control circuit 816, to enable communication between electrode module 809 and control circuit 816. Any suitable communication protocol may be utilized, such as at least one near field communication (NFC) protocol. The electronic circuitry also may include a power storage unit 837 to store power from power receiver 835, a controller 838, and a digital-to-analog converter (DAC) and pulse generator 839. The electronic circuitry of any module of Section III may be sealed inside a housing to prevent damage if the module comes into contact with liquid, such as a culture medium.

Figure 9:
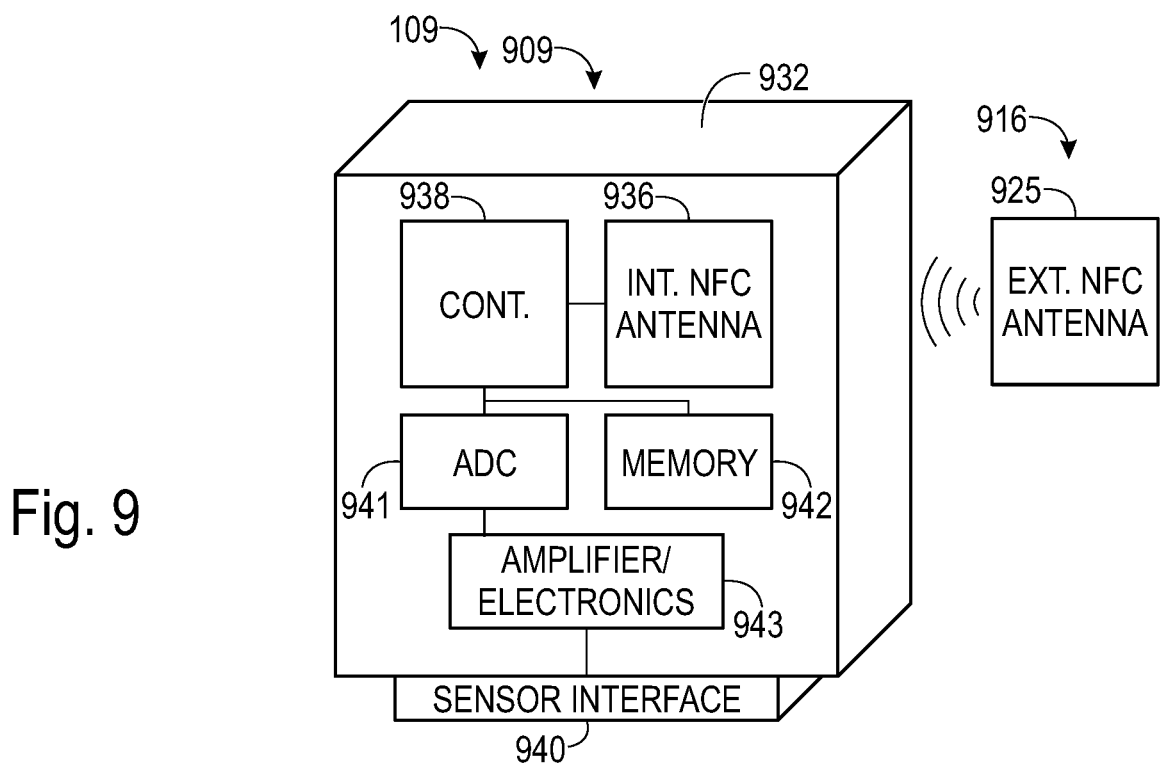
FIG. 9 is a somewhat schematic view of an exemplary sensor module for use in the vessels of FIG. 1 or the method of FIG. 6, along with an antenna of a control circuit configured to power and operate the sensor module.

FIG. 9 shows an exemplary sensor module 909 (i.e., an electric/magnetic embodiment of module 109), and also shows a communication antenna 925 of a control circuit 916. Antenna 925 is configured to transmit power to and operate sensor module 909. Accordingly, a separate power antenna and power receiver may not be necessary (compare with FIG. 8).

Sensor module 909 comprises a housing 932 supporting a sensor interface 940. The sensor interface may be located on any suitable side of housing 932, such as a bottom side, as shown, or a lateral side thereof (e.g., if sensor module 909 is contained in a culture chamber), among others. Sensor interface 940 may be configured to sense and measure any suitable physical or chemical parameters, such as temperature, movement, an electrical parameter (e.g., potential, current, impedance, etc.), electric/magnetic fields (e.g., with a Hall effect sensor), pH, chemical potential, oxygen or carbon dioxide concentration, a chemical compound (e.g., with an electrochemical sensor), etc. Sensor module 909 may be suitable when remote sensing is difficult or not possible, or when advantageous to establish direct contact between sensor interface 940 and a multicellular structure to be analyzed.

Housing 932 may contain any suitable electronic circuitry to enable wirelessly powering, communicating with, and/or controlling sensor module 909. This circuitry may include an internal communication antenna 936 to receive signals from, and/or send signals to, external communication antenna 925 of control circuit 916, to power and operate sensor module 909. Any suitable communication protocol may be utilized, such as at least one near field communication (NFC) protocol. The electronic circuitry also may include a controller 938, an analog-to-digital converter (ADC) 941, memory 942, and an amplifier and sensor electronics 943.

Figure 10:
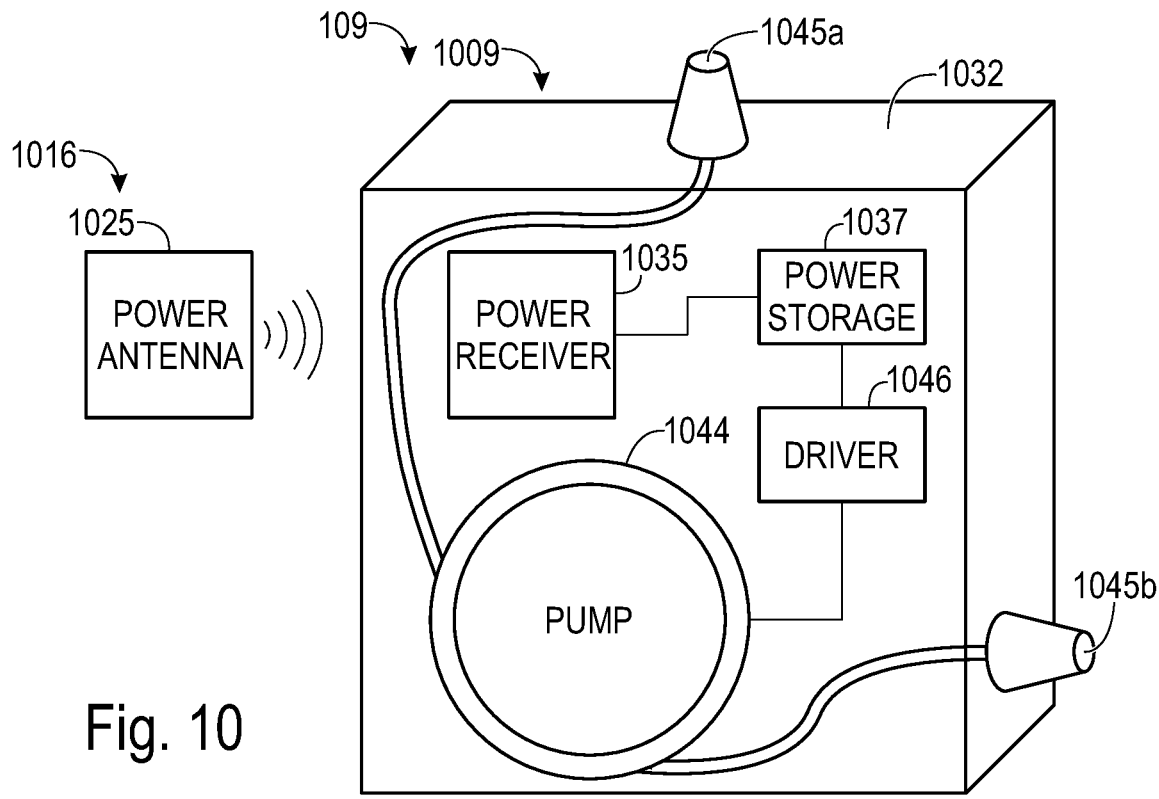
FIG. 10 is a somewhat schematic view of an exemplary pump module for use in the culture system of FIG. 1 or the method of FIG. 6, along with a power antenna of a control circuit configured to power and operate the pump module.

FIG. 10 shows an exemplary pump module 1009 (i.e., an electric/magnetic embodiment of module 109), and also shows a power antenna 1025 of a control circuit 1016. Power antenna 1025 is configured to transmit power to pump module 1009. A separate communication antenna may or may not be present in control circuit 1016 (compare with FIG. 8).

Pump module 1009 includes a housing 1032 containing a pump 1044 to drive fluid flow. Pump 1044 is in fluid communication with a pair of nozzles 1045*a*, 1045*b* located at the periphery of pump module 1009. Operation of pump 1044 pulls fluid into nozzle 1045*a* (acting as an inlet) and pushes fluid out of nozzle 1045*b*, or vice versa if the pump is driven in reverse. This movement of fluid may enhance flow of a culture medium in a culture vessel and/or may generate turbulence to stimulate organoid development, among others. The use of pump module 1009 may be suitable when gravity-driven flow is not applicable or is inefficient (e.g., due to properties of the media).

Housing 1032 may contain any suitable electronic circuitry to enable wirelessly receiving power from control circuit 1016 and operating pump 1044. This circuitry may include a power receiver 1035 to receiver power transmitted wirelessly from power antenna 1025, such as by inductive or capacitive coupling. The electronic circuitry also may include a power storage unit 1037 and a pump driver 1046.

Figure 11:
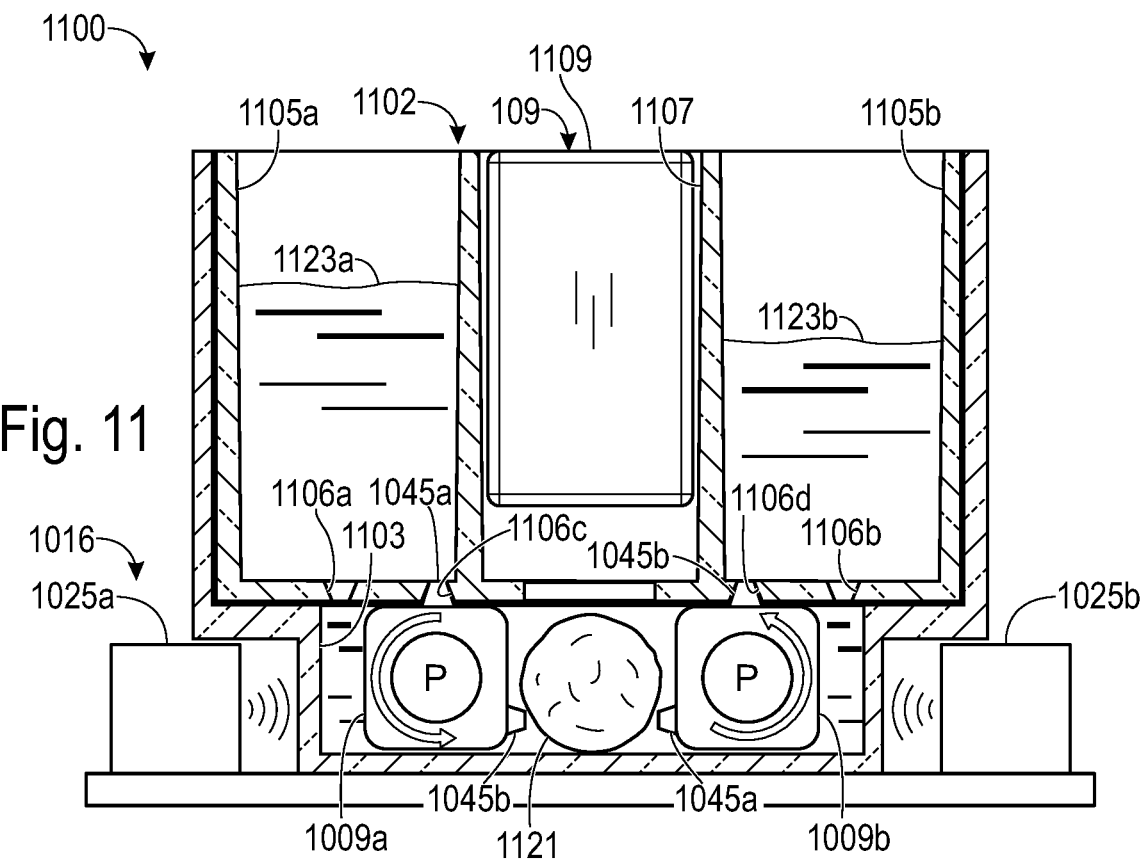
FIG. 11 is a partially sectional, partially schematic view of selected aspects of an implementation of the system of FIG. 1 including two copies of the pump module of FIG. 10 contained in a culture chamber of a culture vessel, at positions adjacent an organoid.

FIG. 11 shows an exemplary culture system 1100 including a pair of pump modules 1009*a*, 1009*b* contained in a culture vessel 1102 (also see FIG. 10). Vessel 1102 includes a culture chamber 1103 containing an organoid 1121. Three compartments are located vertically above culture chamber 1103, namely, a pair of reservoirs 1105*a*, 1105*b* holding respective culture media 1123*a*, 1123*b*, and a slot 1107 housing a dummy module 1109 (which is an example of module 109 of FIG. 1). Reservoir 1105*a* communicates with culture chamber 1103 via a pair of channels 1106*a*, 1106*c*, and reservoir 1105*b* communicates with culture chamber 1103 via a pair of channels 1106*b*, 1106*d*.

Pumps 1009*a*, 1009*b* are driven, respectively, by power transmitted from power antennas 1025*a*, 1025*b* of control circuit 1016. Pump 1009*a* drives culture medium 1123*a* from reservoir 1105*a*, through channel 1106*c*, and into culture chamber 1103. Pump 1009*b* drives culture medium from culture chamber 1103, through channel 1106*d*, and into reservoir 1105*b*. Accordingly, there is net pump-driven flow of media from reservoir 1105*a* to reservoir 1105*b*. The pumps can be driven in reverse to move media back to reservoir 1105*a* from reservoir 1105*b*, or this may occur via gravity-driven flow through channels 1106*a*, 1106*b*.

Figure 12:
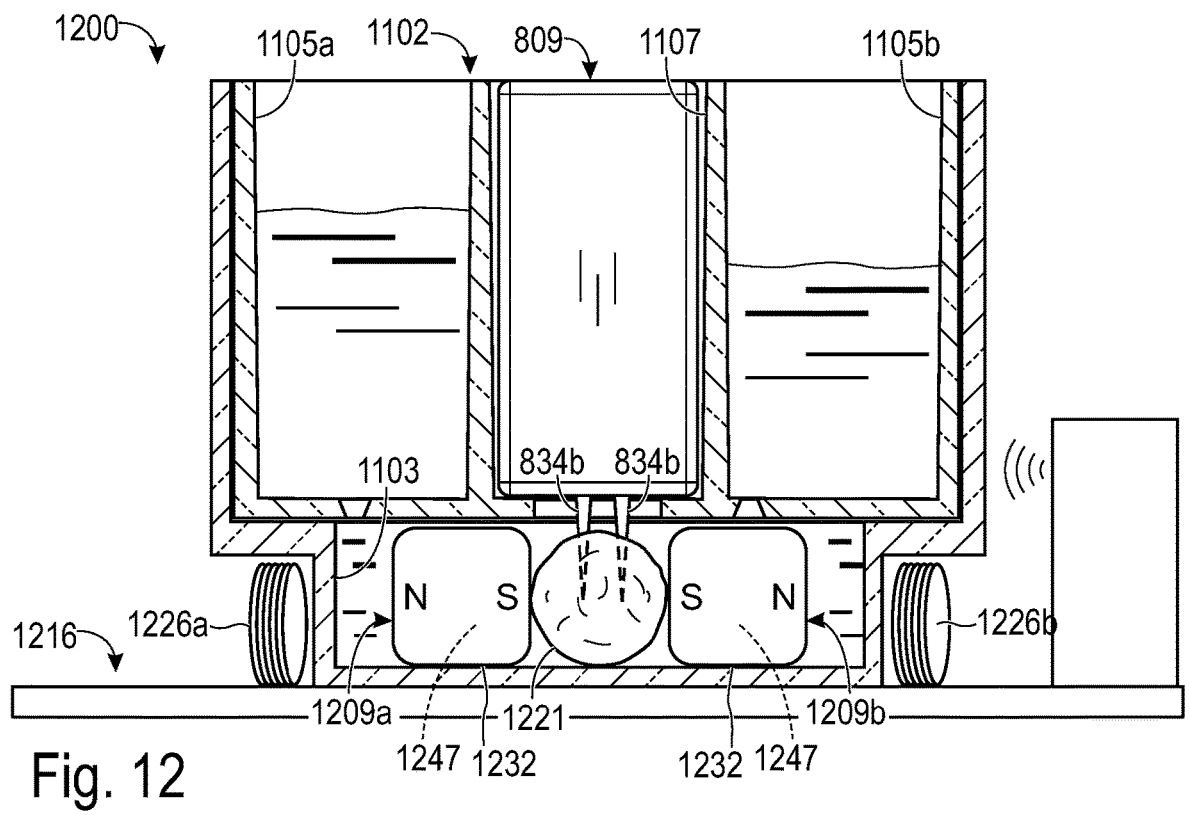
FIG. 12 is a partially sectional, partially schematic view of selected aspects of an implementation of the system of FIG. 1 including a control circuit, the culture vessel of FIG. 11, and a pair of magnetic modules contained in the culture chamber of the culture vessel, with an organoid located between the magnetic modules.

FIG. 12 shows a culture system 1200 for mechanically stimulating an organoid 1221 or other multicellular structure. Culture system 1200 includes vessel 1102 (see FIG. 11), a control circuit 1216, and a pair of magnetic modules 1209*a*, 1209*b* contained in culture chamber 1103 of vessel 1102. Organoid 1221 may be located between the magnetic modules. The magnetic modules can function as magnetic actuators to apply alternating mechanical strain to the organoid, where the driving principle is magnetic force applied by control circuit 1216 to create a linear drive.

Electrode module 809 may be located in slot 1107, with both pin electrodes 834*b* extending into organoid 1221 (also see FIG. 8). However, the mechanical stimulation of organoid 1221 provided by movement of magnetic modules 1209*a*, 1209*b* driven by control circuit 1216, as discussed below, does not require the presence of electrode module 809.

Each magnetic module 1209*a*, 1209*b* includes a permanent magnet 1247, which may be encapsulated by a housing 1232. The housing may have a surface coating that facilitates attachment to organoid 1221. Magnets 1247 of magnetic modules 1209*a*, 1209*b* each have a north pole (N) and south pole(S), with a magnetic axis extending through both poles. Magnetic modules 1209*a*, 1209*b* may be arranged in culture chamber 1103 such that the magnetic axes of the magnetic modules are coaxial to one another, and antiparallel, as shown, to create magnetic repulsion, or parallel, to create magnetic attraction.

Figure 13:
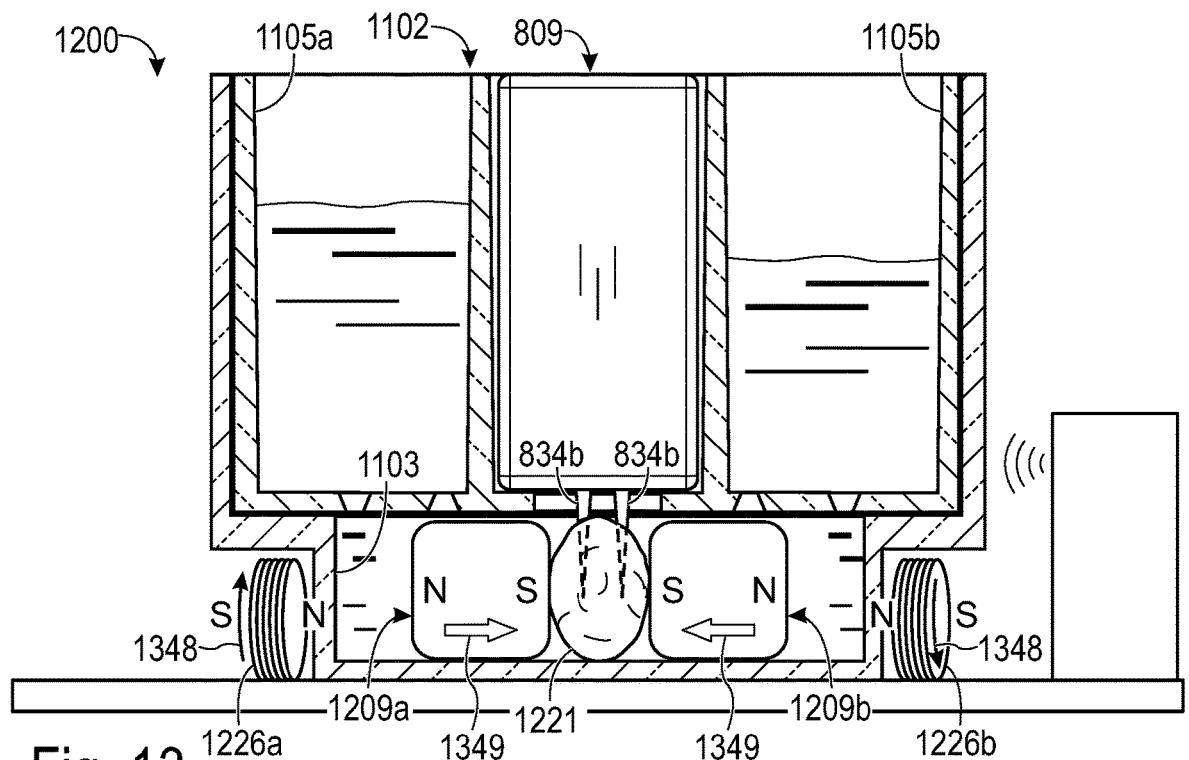
FIG. 13 is another view of the system implementation of FIG. 12, taken with coils of the control circuit energized to drive movement of the magnetic modules toward one another, in order to mechanically stimulate the organoid.
Figure 14:
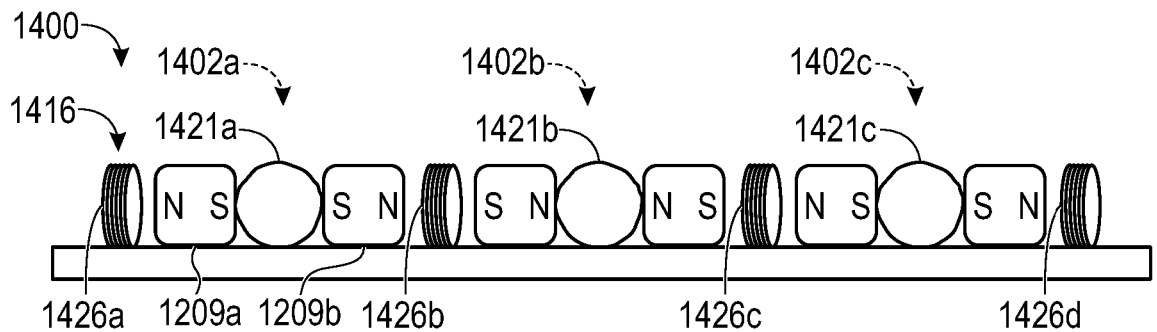
FIG. 14 is a schematic side view of the system implementation of FIG. 12 modified for culture and mechanical stimulation of a set of organoids contained in a row of culture vessels, taken with the culture vessels omitted and with coils of the control circuit not electrically energized.
Figure 15:
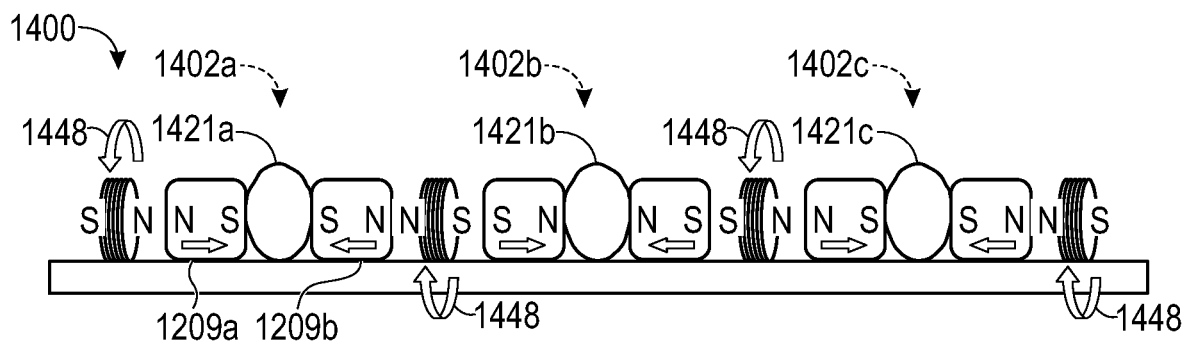
FIG. 15 is another schematic side view of the modified system implementation of FIG. 14, taken with the coils electrically energized to drive linear motion of each pair of magnetic modules along the row of culture vessels.

Control circuit 1216 includes at least one coil (such as a pair of fixed coils 1226*a*, 1226*b*) that is electrically energizable to create one or more additional magnetic fields. The additional magnetic field(s) effectively enhances or diminishes the attraction or repulsion between magnetic modules 1209*a*, 1209*b*, thereby driving movement of the magnetic modules toward or away from one another. Each coil 1226*a*, 1226*b* defines a coil axis, which may be oriented parallel to the magnetic axes of magnetic modules 1209*a*, 1209. FIG. 13 illustrates energization of both coils 1226*a*, 1226*b*, indicated by electric current arrows 1348, and generation of the indicated magnetic field polarities at the coils. Magnetic repulsion between coil 1226*a* and magnetic module 1209*a*, and between coil 1226*b* and magnetic module 1209*b*, drives movement of the magnetic modules toward one another, indicated by motion arrows at 1349, which applies compression to organoid 1221. In other cases, energization of coils 1226*a*, 1226*b* may drive magnetic modules 1209*a*, 1209*b* farther apart, which may apply tension to the organoid if it is attached to both modules. In yet other cases, the magnetic modules may be used for magnetic sensing of organoid movement. The ability to apply repetitive mechanical stress through magnetic modules is particularly valuable for certain types of organoids, such as bone organoids and muscle organoids, which may require this stress for proper development. FIGS. 14 and 15 schematically illustrate how the magnetic drive mechanism of FIGS. 12 and 13 can be implemented in a culture system 1400 including a row of culture vessels 1402*a*-1402*c*. (The positions of the culture vessels are roughly indicated with dashed arrows, but the vessels themselves are omitted to simplify the illustration.) Each culture vessel 1402*a*-1402*c* contains a respective organoid 1421*a*-1421*c* sandwiched between a pair of magnetic modules 1209*a*, 1209*b*, as described above for a single culture vessel 1102. A control circuit 1416 provides a series of electrically-energizable coils 1426*a*-1426*d* arranged along the same line as vessels 1402*a*-1402*c*, organoids 1421*a*-1421*c*, and each pair of magnetic modules 1209*a*, 1209*b*. The coil axes defined by coils 1426*a*-1426*d* each extend along the row of vessels 1402*a*-1402*c*.

The positions of magnetic modules 1209*a*, 1209*b* are shown in FIG. 14 without, and in FIG. 15 with, electrical energization of coils 1426a-1426d. The electrical energization is indicated with arrows at 1448 in FIG. 15. As described above for a single culture vessel in FIGS. 12 and 13, appropriate electrical energization of coils 1426a-1426d drives each pair of magnetic modules 1209a, 1209b toward one another linearly along the line of vessels 1402a-1402c, which permits organoids 1421a-1421c to be mechanically stimulated in synchrony.

Figure 16:
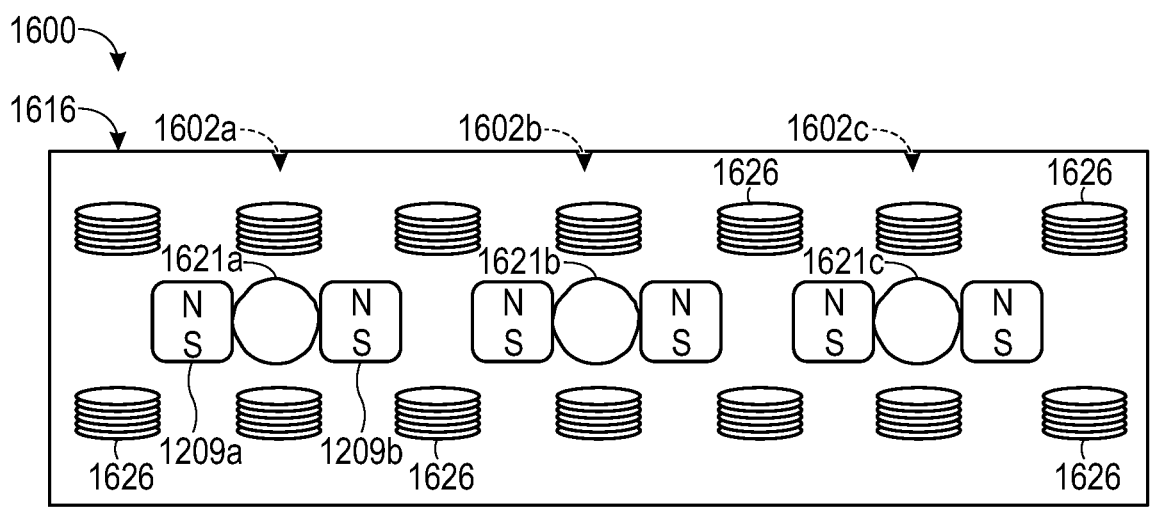
FIG. 16 is a schematic top view of a modified implementation of the system of FIG. 14 having a different configuration of electrically-energizable coils to drive linear movement of the magnetic modules along the same line.

FIG. 16 is a schematic top view of a culture system 1600 having a different configuration of electrically-energizable coils 1626 to drive movement of magnetic modules 1209a, 1209b of FIGS. 14 and 15. (Only a subset of coils 1626 are identified with numeric identifiers.) Culture system 1600 includes a row of vessels 1602a-1602c. (The positions of the vessels are roughly indicated with dashed arrows, but the vessels themselves are omitted to simplify the illustration.) Each vessel 1602a-1602c contains a respective organoid 1621a-1621c sandwiched between a pair of magnetic modules 1209a, 1209b as described above for culture system 1400. However, the magnetic axes of each pair of magnetic modules 1209a, 1209b are oriented orthogonally to the row of vessels 1602a-1602c, such as horizontally, as shown. A control circuit 1616 provides at least one row or a pair of rows of coils 1626. Each coil 1626 may define a coil axis that is parallel to the magnetic axes of the magnetic modules. Appropriate electrical energization of coils 1626 drives magnetic modules 1209a, 1209b linearly in a direction parallel to the row of vessels 1602a-1602c, to mechanically stimulate organoids 1621a-1621c.

Figure 17:
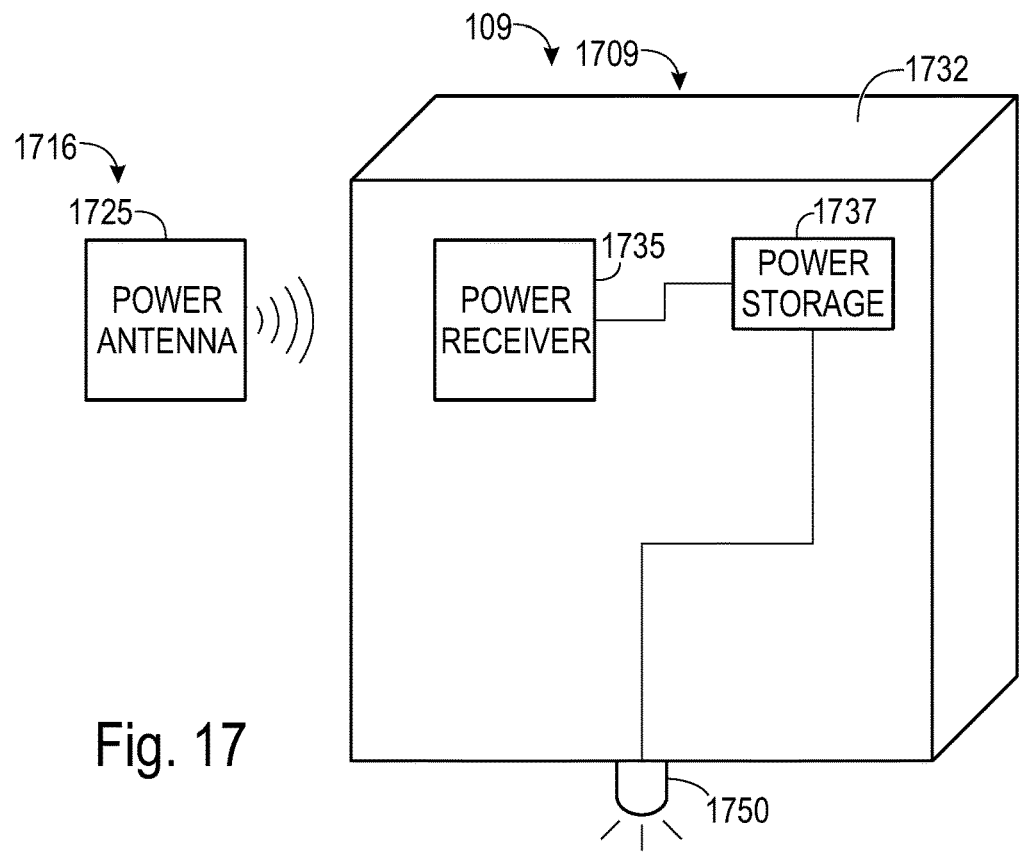
FIG. 17 is a somewhat schematic view of an exemplary light module for use in the culture vessels of the present disclosure.

FIG. 17 shows an exemplary light module 1709 (i.e., an electric/magnetic embodiment of module 109) configured to be wirelessly powered and controlled by a control circuit 1716 via a power antenna 1725 thereof. Light module 1709 includes a housing 1732 containing a power receiver 1735 to receive power from power antenna 1725, a power storage unit 1737, and a light source 1750. The light source generates optical radiation, which may be used for optical stimulation (e.g., via optogenetics) of a multicellular structure in a vessel and/or irradiation for optical detection of the multicellular structure.

Exemplary light sources include a light-emitting diode, a laser, or the like. The light source also may include any suitable optics to direct or focus light. For example, the light source may have a waveguide, such as an optical fiber, to direct light from light module 1709 onto a surface of the multicellular structure and/or to extend into the multicellular structure, to irradiate the multicellular structure from inside.

Light module 1709 may be used to facilitate imaging a multicellular structure contained in the culture chamber of a culture vessel. For example, the light module may provide bright field illumination or dark field illumination of the multicellular structure when located appropriately in the culture vessel, such as in a reservoir, a slot, or a culture chamber thereof.

IV. PASSIVE MODULES

Figure 18:
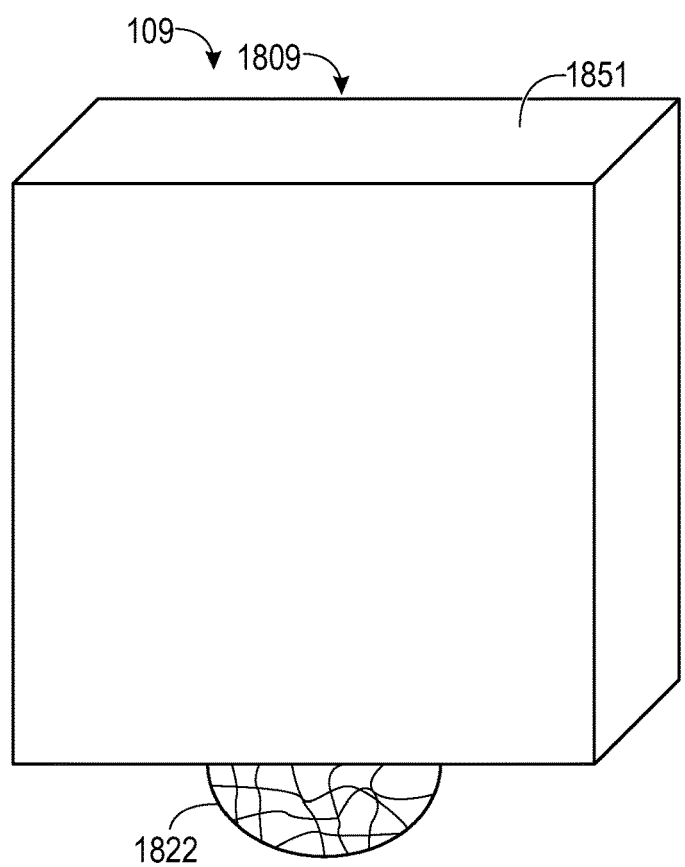
FIG. 18 is a somewhat schematic view of an exemplary scaffold module including a scaffold attached to a body of the module and configured to support formation and growth of an organoid.
Figure 19:
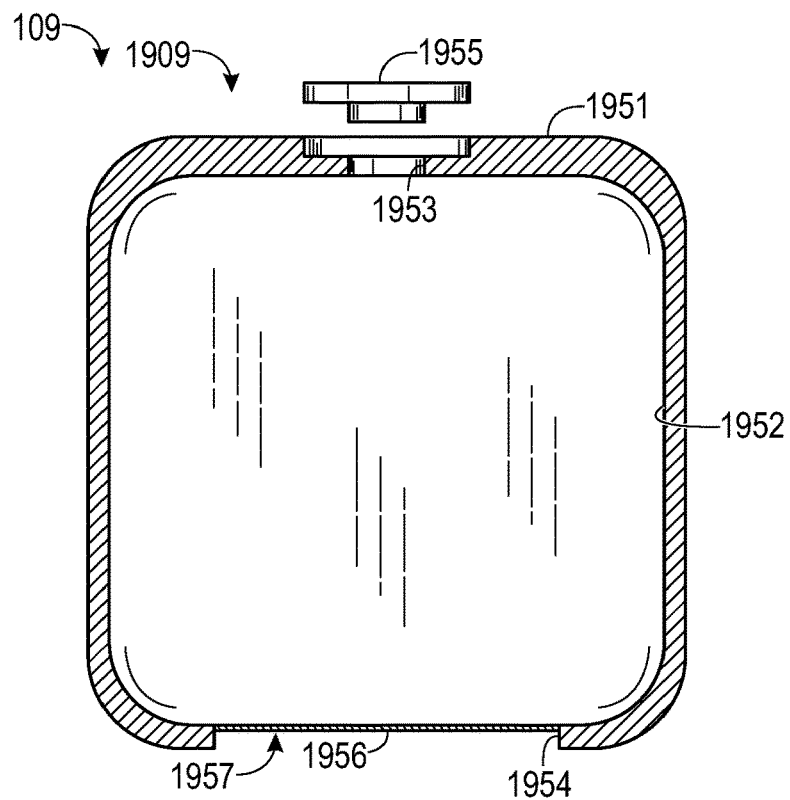
FIG. 19 is a sectional view of an exemplary permeable-interface module for use in the culture system of FIG. 1 or the method of FIG. 6.
Figure 20:
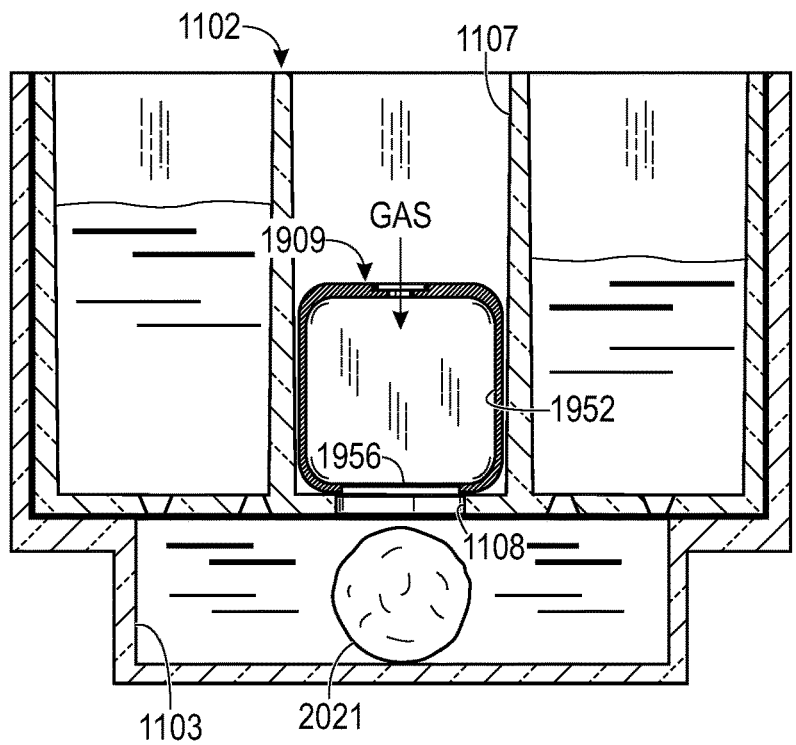
FIG. 20 is a sectional view of the permeable-interface module of FIG. 19 operatively located in a slot of a culture vessel containing an organoid.

This section describes exemplary passive modules for use in the culture systems and methods of the present disclosure; see FIGS. 18-20. The passive modules are configured to function without a source of power and without interaction with a control circuit. Each passive module may be configured to be placed into a particular compartment of a vessel or alternatively in each of two or more compartments of the vessel.

FIG. 18 is a somewhat schematic view of an exemplary scaffold module 1809, which an embodiment of module 109 of FIG. 1A. The scaffold module includes a body 1851 and a scaffold 1822 attached to body 1851. Scaffold 1822 is configured to support formation and growth of a multicellular structure such as an organoid. The scaffold may be formed on body 1851, such as by 3-D printing, or may be formed first and then attached to body 1851. In either case, scaffold 1822 may be mounted on any suitable side of body 1851, such as a bottom side, a top side, or a lateral side, among others. Scaffold module 1809 may be located in a slot of a culture vessel, such as placed into the slot during manufacture of the culture vessel or by a user. In some cases, the scaffold module may be an insert that forms one or more reservoirs of the culture vessel, as described further below in Section V. The scaffold module may be used to mount and support a scaffold, as well as keeping the scaffold in place and enabling improved handling and scaffold addition and removal.

FIG. 19 shows an exemplary permeable-interface module 1909, which is an embodiment of module 109 of FIG. 1A. The permeable-interface module is sectioned in FIG. 19 to reveal its interior structure. Permeable-interface module 1909 has a hollow body 1951 defining a cavity 1952 that is contiguous with an inlet 1953 and an interface opening 1954. Inlet 1953 may be plugged with a removable cap 1955. A permeable member 1956, such as a permeable membrane or a gel, is attached to hollow body 1951 at interface opening 1954, to create a permeable interface 1957 (e.g., a permeable wall) on any suitable side of body 1951, such as a bottom side, a top side, or a lateral side, among others. Permeable interface 1957 allows passage of fluid and/or small molecules into or out of cavity 1952 via the permeable interface, optionally selectively.

Permeable-interface module 1909 may contain any suitable medium in cavity 1952. The medium may be a gas, a liquid, a gel, or the like. The medium may have a different phase, composition, and/or chemical potential than a culture medium present in the culture chamber of the vessel. Permeable interface 1957 may be positioned in physical contact with a multicellular structure and/or a culture medium in the vessel. As an example, permeable-interface module 1909 may contain air (or other gas) in cavity 1952 to create a gas/liquid interface at permeable member 1956, to enable culture of a lung organoid in the culture chamber of the culture vessel. In other examples, permeable-interface module 1909 may contain any suitable chemical compounds, which can be discharged to the culture chamber of the culture vessel through permeable member 1956.

FIG. 20 shows permeable-interface module 1909 operatively positioned in slot 1107 of vessel 1102 (also see FIG. 11), adjacent aperture 1108 and over a lung organoid 2021. Cavity 1952 is filled with gas, such that permeable member 1956 forms a gas-liquid interface between the gas in cavity 1952 and a liquid culture medium in culture chamber 1103.

A passive module contained in a compartment of the culture vessel may be described as a dummy module. The dummy module may be a placeholder. Like any of the modules of the present disclosure, the dummy module may function to reduce the fluid-holding capacity of the vessel, and/or may obstruct or seal a slot over the culture chamber. However, the dummy module also may provide surface shapes (concave or convex), surface chemistries/textures (e.g., hydrophilic, microstructured, etc.), and/or functional surfaces that are advantageous for the culture protocol.

V. VESSEL ASSEMBLY

This section describes exemplary vessel assemblies, vessel arrays formed with the vessel assemblies, and culture vessels of the vessel assemblies, for use in the culture systems and methods of the present disclosure; see FIGS. 21-40.

Figure 21:
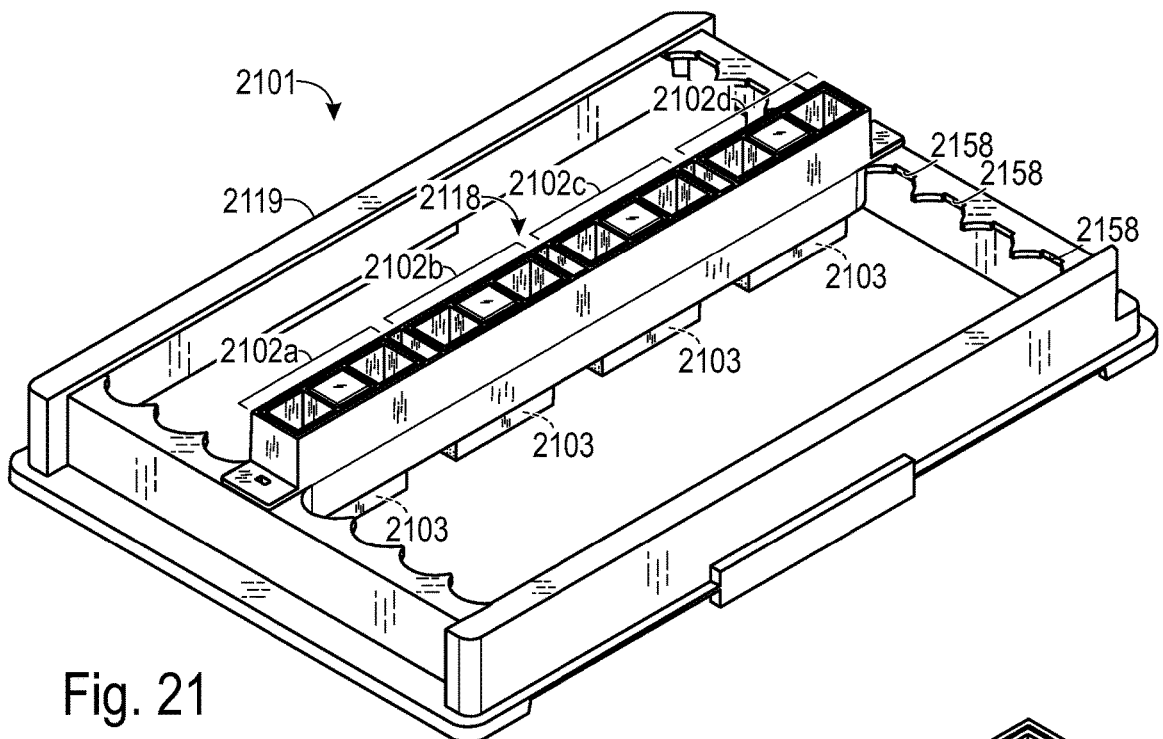
FIG. 21 is an isometric view of a frame holding an exemplary culture device for use in the system of FIG. 1 or the method of FIG. 6, where the culture device includes a vessel assembly forming a row of culture vessels including a corresponding row of culture chambers each containing a pair of magnetic modules and each located adjacent a respective slot containing another module that is structurally and functionally different from the magnetic modules.

FIG. 21 shows an exemplary vessel array 2101 for culturing a corresponding arrangement of multicellular structures, such as organoids. Vessel array 2101 comprises at least one vessel strip 2118 held by a frame 2119. Only one vessel strip 2118 is shown in FIG. 21, but frame 2119 is configured to removably hold two, three, or more vessel strips 2118, which may be substantially identical to one another. In the depicted embodiment, frame 2119 defines eight receiving sites 2158 for a corresponding number of vessel strips 2118 arranged in a row, but only a subset of receiving sites 2158 may be occupied by vessel strips 2118 at any given time. Frame 2119 may have a footprint that corresponds to that of a standard microplate (a standard microplate footprint is 127.71 mm×85.43 mm), where the length and width of the frame's footprint are each within 10% or 5% of those of the standard microplate. This correspondence of frame 2119 with a standard microplate footprint achieves mechanical compatibility with incubators, analytic instrumentation, and handling systems for standard microplates.

Vessel strip 2118 forms a row of at least two, three, or more culture vessels, such as four culture vessels 2102a-2102d in the depicted embodiment. Each culture vessel 2102a-2102d includes a respective culture chamber 2103 formed by a lower region of the culture vessel.

Figure 22:
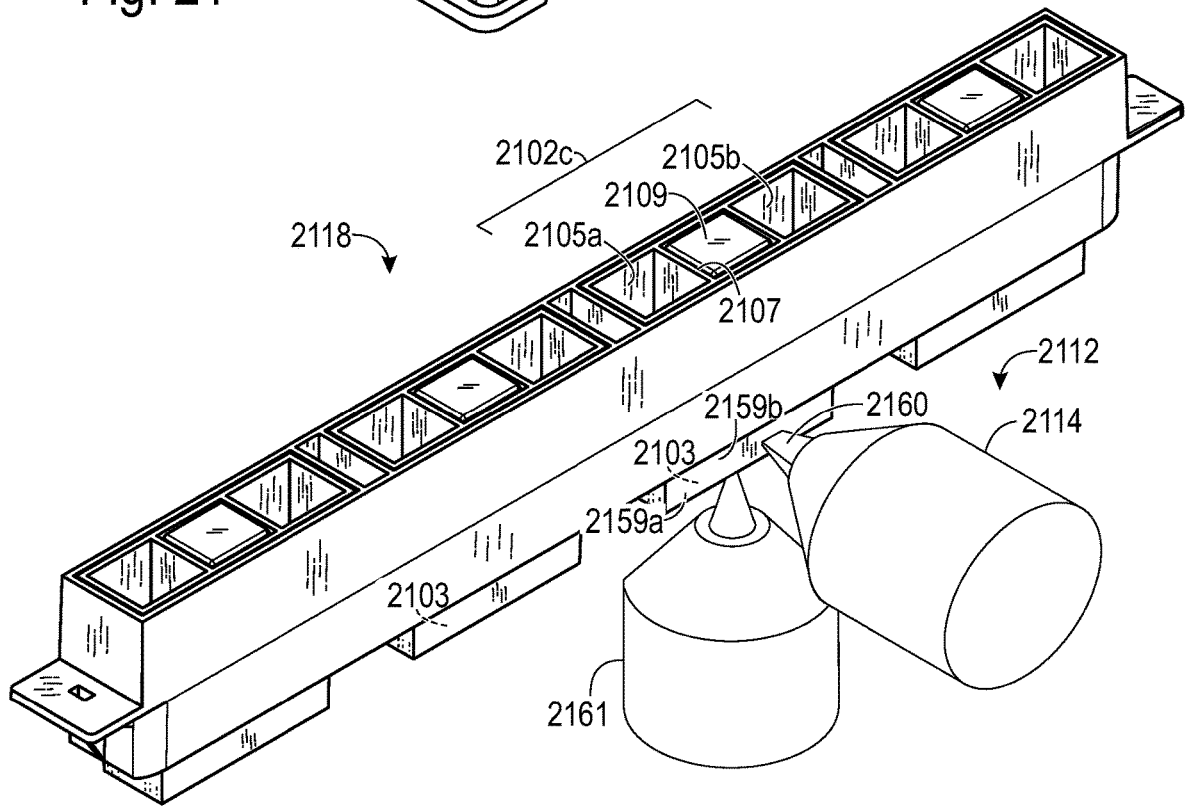
FIG. 22 is an isometric view of the culture device of FIG. 21 after removal from the frame of FIG. 21 and operative alignment of one of the culture vessels of the vessel assembly with a light source and an objective of an imaging system.

FIG. 22 shows vessel strip 2118 removed from frame 2119, to enable imaging of multicellular structures contained in culture chambers 2103. Removal of vessel strip 2118 from frame 2119 allows the vessel strip to be properly positioned with respect to an imaging system 2112 (or other detection system), without interference from frame 2119 or other vessel strips 2118 held by the frame.

Each culture chamber 2103 has one or more optical windows formed by one or more walls of the culture chamber. Each optical window is configured to be transmissive for optical radiation, such as visible light, and may have smooth inner and outer surfaces, optionally planar, to minimize scattering of the optical radiation. In the depicted embodiment, each culture chamber 2013 has a bottom optical window 2159a, and a pair of lateral optical windows 2159b, 2159c arranged opposite one another across culture chamber 2103 (also see FIGS. 24, 26, and 30).

FIG. 22 illustrates how imaging system 2112 may capture an image of a multicellular structure contained in culture vessel 2102c. A thin section of the multicellular structure may be illuminated through lateral optical window 2159b (and/or window 2159c) of the culture vessel using a light source 2114, which may produce a light sheet 2160. Light (e.g., fluorescence) from the multicellular structure may be collected with an objective 2161 that gathers light which has propagated through bottom optical window 2159a of culture vessel 2102c. Accordingly, imaging system 2112 may perform selective plane illumination microscopy (SPIM), also known as light-sheet microscopy. In other examples, illumination may be performed through bottom optical window 2159a, and light collection from one of lateral optical windows 2159b or 2159c. In yet other examples, illumination may be performed with a light module located in the culture vessel (e.g., see Section III). In still other examples, imaging system 2112 may utilize two-photon excitation microscopy, tomography, or the like.

Vessel strip 2118 provides a respective pair of reservoirs 2105a, 2105b and a respective slot 2107 located over culture chamber 2013 of each vessel 2102a-2102d (see FIGS. 21 and 22). A slot module 2109 may be located in slot 2107 and may be any of the electric/magnetic or passive modules disclosed herein (e.g., see Sections I, III, and IV).

Figure 23:
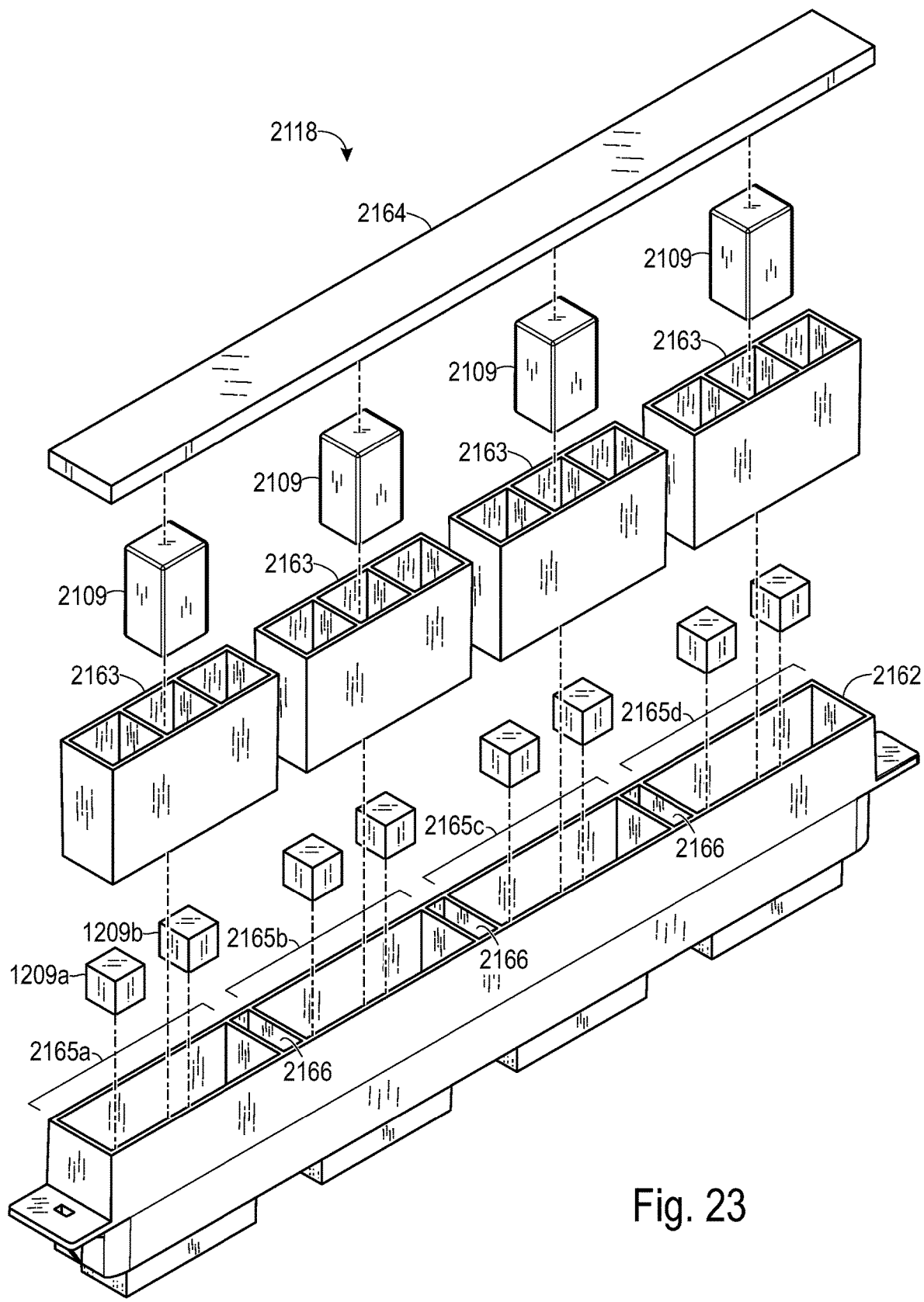
FIG. 23 is an isometric, exploded view of the culture device of FIG. 21, including a lid not shown in FIG. 21 or FIG. 22.
Figure 24:
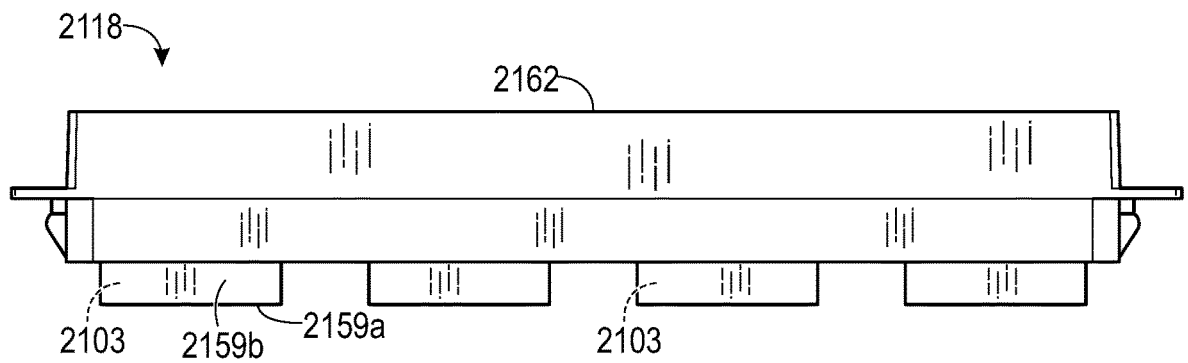
FIG. 24 is a side view of the culture device of FIG. 21 taken in isolation.
Figure 25:
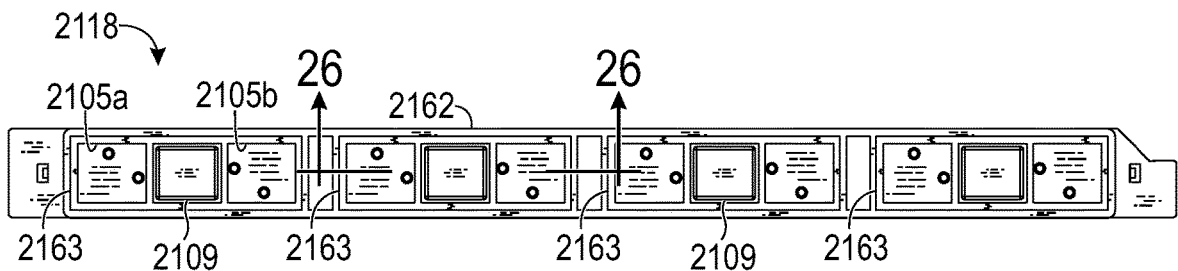
FIG. 25 is a top view of the culture device of FIG. 21 taken in isolation.
Figure 26:
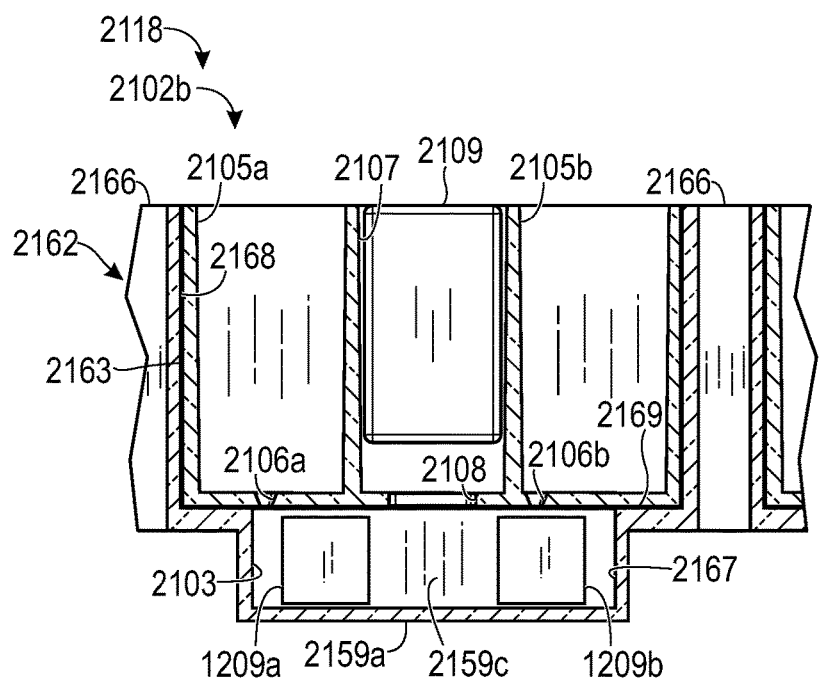
FIG. 26 is a fragmentary, partially sectional view of the culture device of FIG. 21, taken generally along line 26-26 of FIG. 25.
Figure 27:
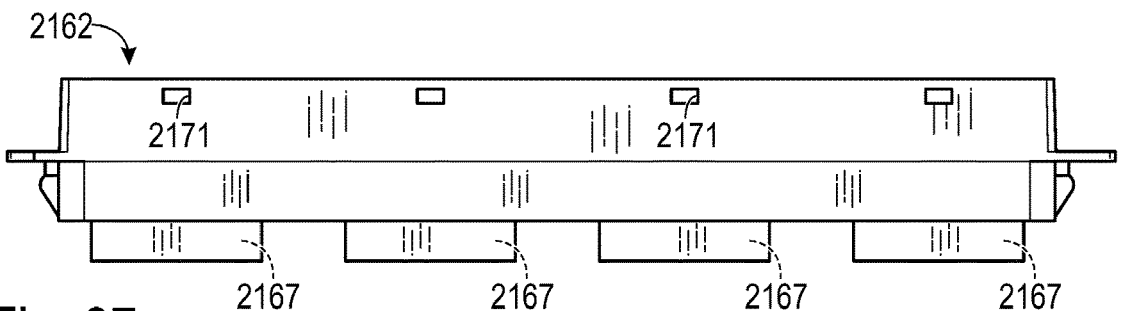
FIG. 27 is a side view of a shell of the culture device of FIG. 21 taken in isolation.
Figure 28:
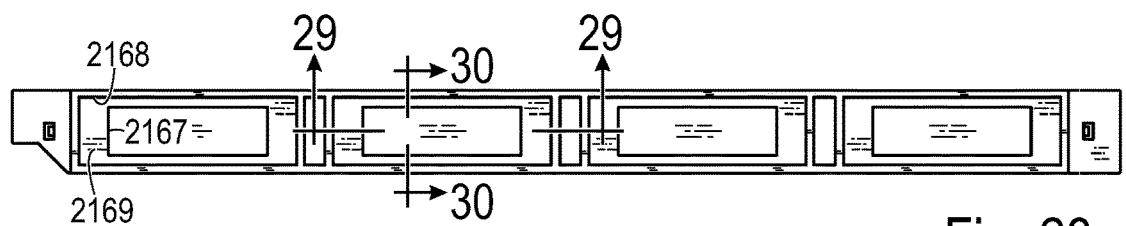
FIG. 28 is a top view of the shell of FIG. 27.
Figure 29:
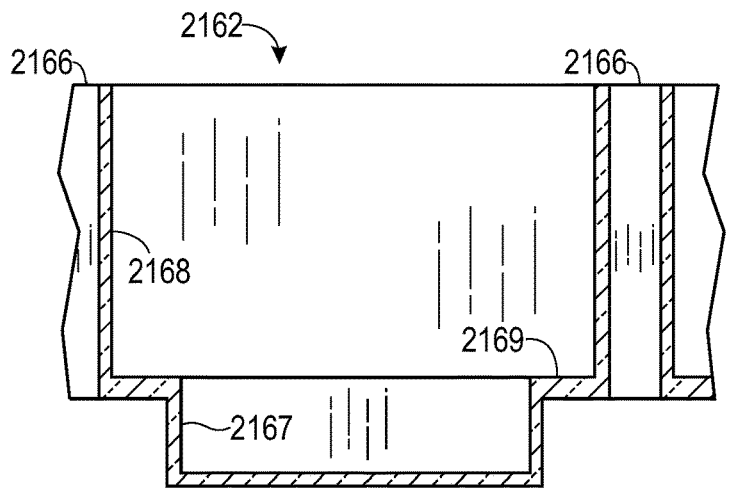
FIG. 29 is a sectional view of the shell of FIG. 28, taken generally along line 29-29 of FIG. 28 through one of the four sections of the shell.
Figure 30:
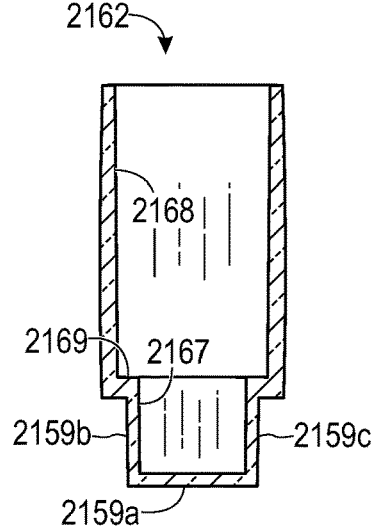
FIG. 30 is another sectional view of the shell of FIG. 28, taken generally along line 30-30 of FIG. 28.

FIG. 23 shows an exploded view of vessel strip 2118. The vessel strip comprises a shell 2162 (interchangeably called a housing), a plurality of inserts 2163 configured to be received in shell 2162, and a lid 2164 configured to cover an open top side of shell 2162 and/or inserts 2163. In some embodiments, lid 2164 may not be needed. A respective pair of magnetic modules 1209a, 1209b may be located in shell 2162 under each insert 2163 (also see Section III), but any other suitable module(s) or no module may be located in the shell under the insert.

Shell 2162 may be divided internally into a plurality of sections, such as sections 2165a-2165d. Sections 2165a-2165d may be formed integrally with one another. Sections 2165a-2165d may be attached directly to one another, or may be separated from one another with a respective spacer region 2166 located intermediate each adjacent pair of the sections.

Each section 2165a-2165d of shell 2162 includes a lower region forming a receptacle 2167 and an upper region forming a receiving space 2168 for one of inserts 2163 (see FIGS. 23, 26, and 28-30). Each culture chamber 2103 is formed cooperatively using shell 2162 and one of inserts 2163, which may capture a module(s) in the culture chamber (such as a pair of magnetic modules 1209a, 1209b in the depicted embodiment (see FIG. 26)). Receptacle 2167 provides lateral walls of culture chamber 2103, and one of inserts 2163 provides a top wall portion of the culture chamber. A scaffold for an organoid may be disposed in receptacle 2167 of each insert 2163, such as formed or placed therein (e.g., attached to the bottom wall or a lateral wall of the receptacle), before insert 2163 is assembled with shell 2162. In other cases, the scaffold may be disposed on a bottom side of insert 2163, such as 3-D printed thereon or attached after scaffold formation, before the insert is assembled with shell 2162. In yet other cases, the scaffold may be provided by module 2109 (also see Section IV).

Each insert 2163 is configured to fit into one of sections 2165a-2165d. Accordingly, the outer dimensions of the insert may correspond to the dimensions of receiving space 2168. Receptacle 2167 may have one or more smaller horizontal dimensions than receiving space 2168, to form a shoulder 2169 at the bottom of receiving space 2168, to support insert 2163 and prevent further advancement downward into the section (see FIGS. 26, 29, and 30).

Each insert 2163 may be locked in shell 2162 by a snap-fit mechanism that engages when the insert is seated in the shell (see FIGS. 27 and 31-33). The insert may define a protrusion 2170 that is received in a respective opening 2171 defined by a lateral wall of shell 2162, or the insert may define the opening and the shell may define the protrusion.

Each insert 2163 defines various openings at the bottom thereof. The openings include at least one channel, such as a pair of channels 2106a, 2106b, at the bottom of each reservoir 2105a, 2105b (see FIG. 33). Each channel 2106a, 2106b extending from reservoir 2105a or 2105b provides fluid communication between one of the reservoirs and a culture chamber 2103 located vertically under the reservoir (also see FIG. 26). The insert also defines an aperture 2108 at the bottom end of slot 2107, to provide fluid communication between slot 2107 and culture chamber 2103 (see FIGS. 26, 33, 34).

Figure 35:
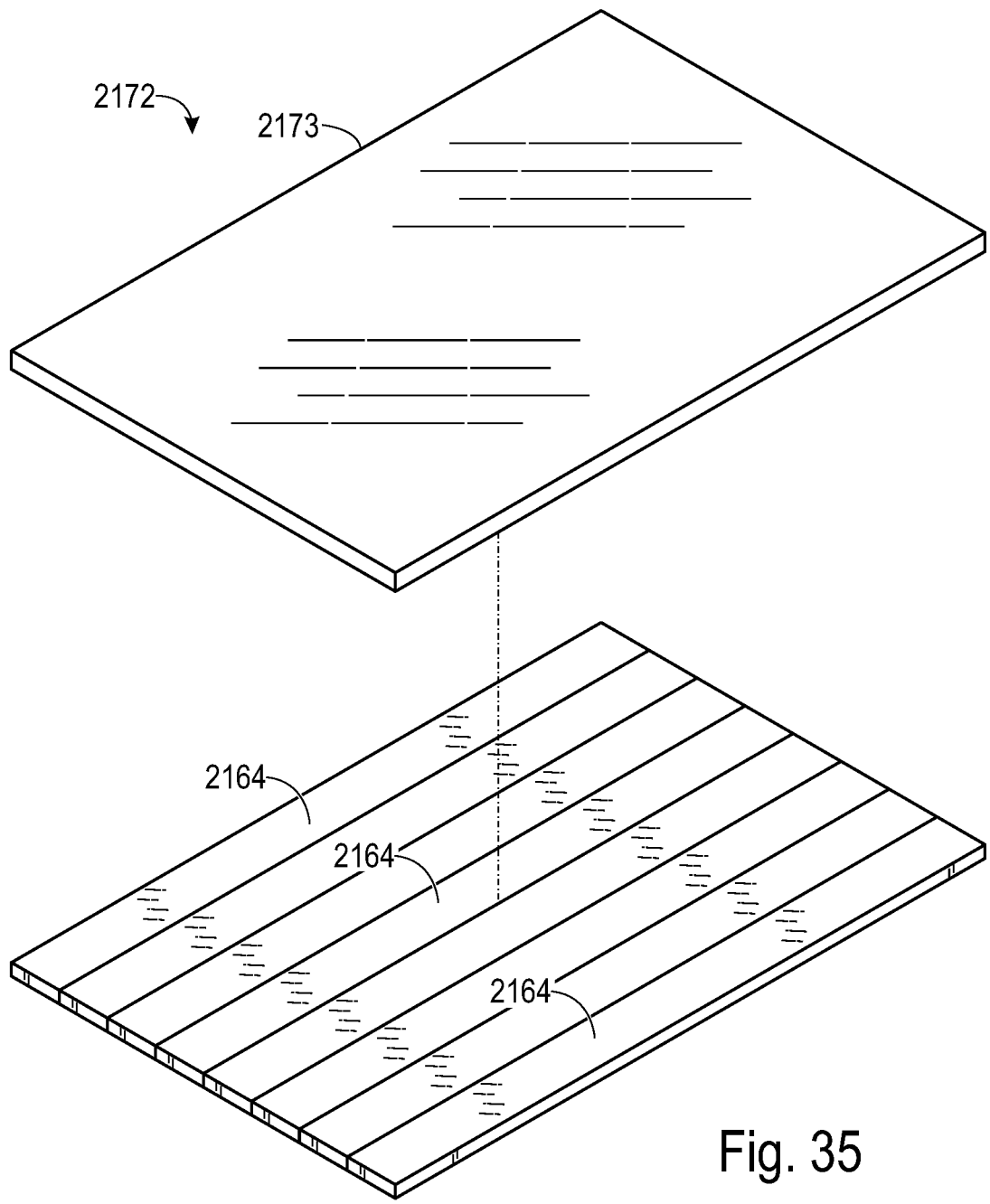
FIG. 35 is an exploded view of a lid assembly for a vessel array that includes a row of vessel assemblies held by the frame of FIG. 21, where the lid assembly includes a series of lids each substantially identical to the lid of FIG. 23.

FIG. 35 shows a lid assembly 2172 for vessel array 2101 (also see FIG. 21). Lid assembly 2172 comprises a series of lids 2164 to cover a corresponding number of vessel strips 2118 held by frame 2119 (also see FIG. 26). Each lid 2164 may fit onto the top of a vessel strip (e.g., the top of shell 2162), and may have a peripheral flange projecting downwardly and configured to vertically overlap and horizontally encircle the vessel strip at its top edge. Maintaining sterility can be a major issue during the entire process of culture and testing, which may take up to several months. Accordingly, a lid assembly 2172 to block entry of contaminating microorganisms via the open tops of reservoirs 2105a, 2015b and slot 2107 of each vessel 2102a-2102d of each vessel strip 2118 would be advantageous. Lid assembly 2172 allows all of the vessel strips to be covered by the same lid assembly, but individual lids 2164 may be removed from lid assembly 2172. For example, lid assembly 2172 may include a carrier 2173 to which each lid 2164 is removably attached (e.g., via a weak adhesive, an interference fit, or a snap-fit mechanism, among others). This configuration enables easy removal of any single vessel strip 2118, including its lid 2164, from other vessel strips 2118 and their lids 2164 of a vessel array 2101, such as for imaging or other processing. In other examples, carrier 2173 may be omitted, and lids 2164 may be formed integrally with one another and configured to be detachable by breaking frangible connections that join adjacent pairs of lids 2164 to one another.

Figure 36:
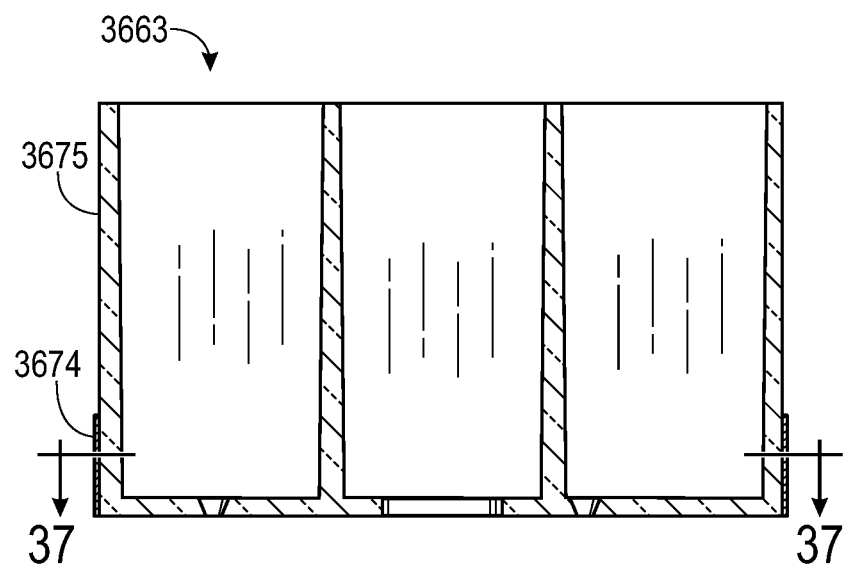
FIG. 36 is a modified form of the insert of FIG. 31 that includes a gasket to create a fluid-tight seal with the shell of FIG. 27.
Figure 37:
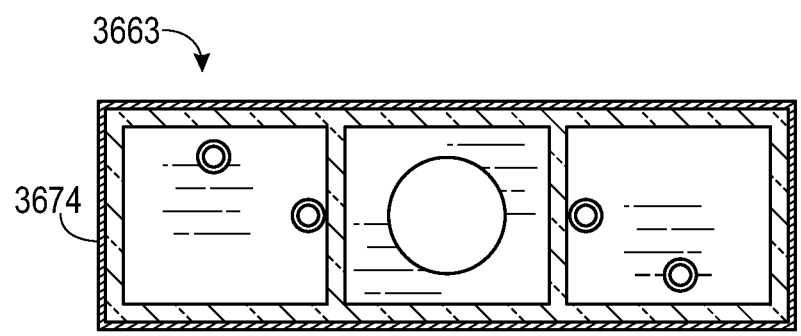
FIG. 37 is a sectional view of the insert of FIG. 36, taken generally along line 37-37 of FIG. 36.

FIGS. 36 and 37 show another exemplary insert 3663 for placement into shell 2162 (also see FIG. 23). Insert 3663 is identical to insert 2163, except that insert 3663 includes a gasket 3674 configured to create a fluid-tight seal with shell 2162. Gasket 3674 may be formed of a softer, more deformable material (e.g., an elastomer), which may be attached to a body 3675 formed of a harder, less deform able material. In some cases, gasket 3674 may be created on body 3675 by overmolding. Gasket 3674 may be located on lateral sides of body 3675, such around a lower region of body 3675, or on a bottom side of body 3675, among others.

Figure 38:
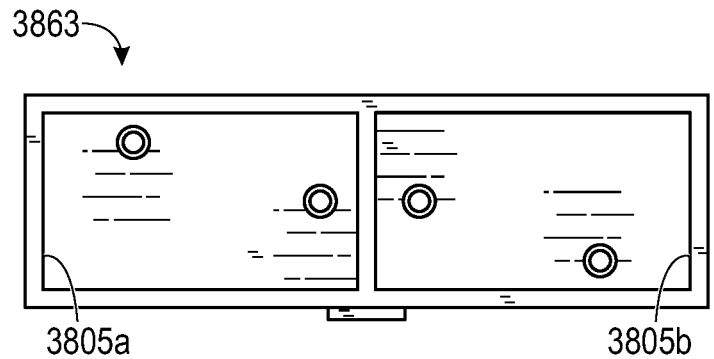
FIG. 38 is a top view of an exemplary slot-less insert for placement into the shell of FIG. 27 to form a culture chamber cooperatively with the shell.

FIG. 38 shows yet another exemplary insert 3863 for placement into shell 2162 (also see FIG. 23). Insert 3863 forms a pair of reservoirs 3805a, 3805b, which are adjacent and share a lateral wall with one another, instead of being separated by a central slot (compare with FIG. 33). Insert 3863 may be advantageous if a scaffold will be attached to the bottom side of the insert because there is more surface area available for attachment. Moreover, insert 3863 allows channels at the bottom of the insert to be located more centrally, for vertical alignment with a multicellular structure positioned centrally in the culture chamber under the insert.

Figure 39:
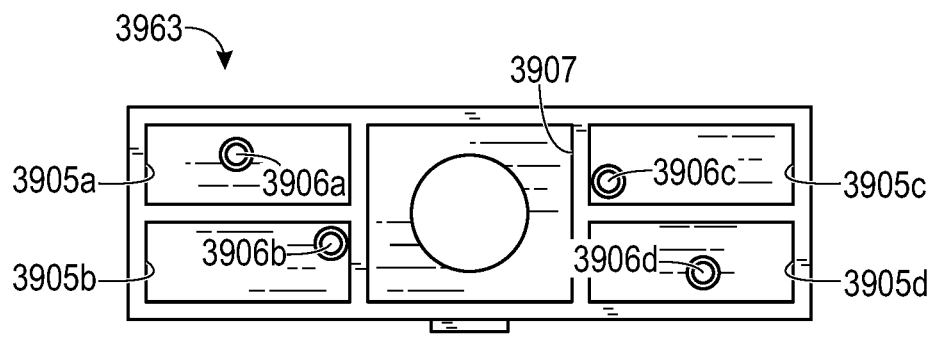
FIG. 39 is a top view of an exemplary four-reservoir insert for placement into the shell of FIG. 27 to form a culture chamber cooperatively with the shell.

FIG. 39 shows still another exemplary insert 3963 for placement into shell 2162 (also see FIG. 23). Insert 3963 forms four reservoirs 3905a-3905d and a central slot 3907 located intermediate pairs of the reservoirs (compare with FIG. 33). Insert 3963 may be advantageous when a multicellular structure is being fed internally and externally with different culture media.

Figure 40:
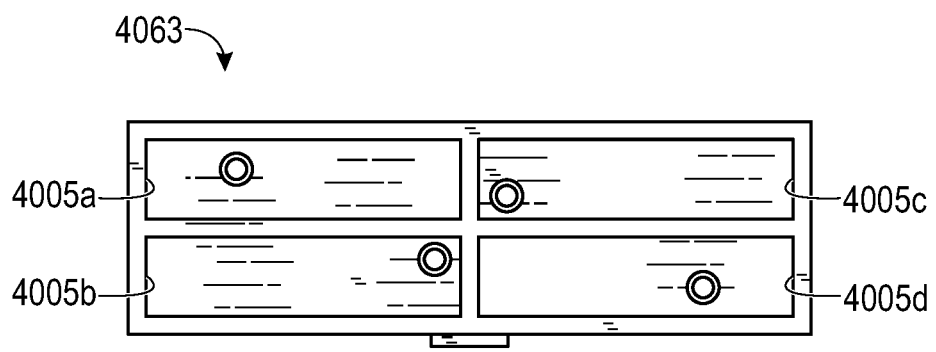
FIG. 40 is a top view of an exemplary slot-less, four-reservoir insert for placement into the shell of FIG. 27 to form a culture chamber cooperatively with the shell.

FIG. 40 show yet still another exemplary insert 4063 for placement into shell 2162 (also see FIG. 23). Insert 4063, like insert 3963, forms four reservoirs 4005a-4005d but lacks a central slot located intermediate pairs of the reservoirs (compare with FIG. 39). Insert 4063 combines the potential advantages of having more than two reservoirs and locating channels centrally over a multicellular structure.

VI. SELECTED ASPECTS

This section describes selected aspects of the systems, methods, and devices of the present disclosure, as a series of indexed paragraphs.

Paragraph A1. A system for culturing a multicellular structure, such as an organoid, the system comprising: (a) a vessel including a culture chamber to contain the multicellular structure (such as an organoid); (b) an electric/magnetic module configured to be coupled to, and/or located in, the vessel, optionally, at a position in or adjacent the culture chamber; and (c) a control circuit configured to wirelessly power and/or operate the electric/magnetic module; wherein, optionally, the electric/magnetic module is removably coupled to and/or removably located in the vessel, wherein, optionally, the electric/magnetic module is capable of being received in each of two or more compartments of the vessel, and wherein, optionally, the two or more compartments are selected from the culture chamber, one or more reservoirs, and/or a slot.

Paragraph A2. The system of paragraph A1, wherein the control circuit is configured to wirelessly power and/or operate the electric/magnetic module using near field radiation.

Paragraph A3. The system of paragraph A2, wherein the control circuit is configured to wirelessly transmit electrical power to the electric/magnetic module via inductive coupling or capacitive coupling.

Paragraph A4. The system of paragraph A2 or A3, wherein the control circuit is configured to wirelessly communicate with the electric/magnetic module via at least one near field communication protocol.

Paragraph A5. The system of any of paragraphs A1 to A4, wherein the electric/magnetic module is contained, or configured to be contained, in the culture chamber and includes a magnet, and wherein the control circuit is configured to create a magnetic field that drives movement of the magnet in the culture chamber.

Paragraph A6. The system of paragraph A5, the electric/magnetic module being a first module and the magnet being a first magnet, further comprising a second module including a second magnet, wherein the first and second modules are contained, or configured to be contained, in the culture chamber at the same time, and wherein the control circuit is configured to drive movement of the first and second magnets relative to one, optionally toward one another and/or away from one another within the culture chamber.

Paragraph A7. The system of any of paragraphs A1 to A6, wherein the electric/magnetic module includes a sensor.

Paragraph A8. The system of paragraph A7, wherein the electric/magnetic module includes a chemical sensor, an electrical sensor, an optical sensor, and/or a temperature sensor.

Paragraph A9. The system of any of paragraphs A1 to A8, wherein the electric/magnetic module includes an electrode.

Paragraph A10. The system of paragraph A9, wherein the electrode is configured to electrically stimulate and/or electrically sense the multicellular structure in the culture chamber.

Paragraph A11. The system of any of paragraphs A1 to A10, wherein the electric/magnetic module includes a light source.

Paragraph A12. The system of paragraph A11, wherein the light source is configured to illuminate at least a portion of the multicellular structure in the culture chamber.

Paragraph A13. The system of any of paragraphs A1 to A12, wherein the electric/magnetic module includes a pump configured to drive fluid flow into and/or out of the culture chamber.

Paragraph A14. The system of any of paragraphs A1 to A13, wherein the electric/magnetic module is located, or configured to be located, in a slot adjacent the culture chamber, and wherein, optionally, the vessel defines an aperture that provides fluid communication between the slot and the culture chamber.

Paragraph A15. The system of paragraph A14, wherein vessel includes two or more reservoirs in fluid communication with the culture chamber, wherein, optionally, the slot is located vertically above the culture chamber and, optionally, between at least a pair of the two or more reservoirs, wherein, optionally, each reservoir of the two or more reservoirs separately communicates with the culture chamber, wherein, optionally, each of the two or more reservoirs is not connected, such as via tubing, to any external source of liquid, wherein, optionally, each of the two or more reservoirs and the culture chamber is formed by and/or located in the same housing, and wherein, optionally, each reservoir of the two or more reservoirs is attached directly to the culture chamber and/or shares a wall with the culture chamber.

Paragraph A16. The system of paragraph A14 or A15, wherein the electric/magnetic module is included in a set of two or more modules configured to perform different functions from one another and to be coupled to, and/or located in, the vessel, and, optionally, interchangeably positionable in the same compartment of the vessel, such as the same reservoir, culture chamber, and/or slot.

Paragraph A17. The system of any of paragraphs A1 to A16, wherein, optionally, the vessel includes at least one or two or more reservoirs each located over the culture chamber (optionally vertically above the culture chamber) and, optionally, each sharing a wall with the culture chamber, wherein, optionally, the two or more reservoirs are formed integrally with one another and/or by a same insert, and wherein, optionally, the electric/magnetic module is located vertically intermediate a top side of the two or more reservoirs and a bottom of the culture chamber, and/or the system further optionally comprises a removable lid configured to be placed on the vessel, to cover the at least one or the two or more reservoirs.

Paragraph A18. The system of any of paragraphs A1 to A17, further comprising a vessel assembly forming a row of vessels that are connected to one another and include the vessel, each vessel of the row of vessels including a respective culture chamber to contain a multicellular structure (such as an organoid), wherein, optionally, the vessels of the row of vessels are substantially identical to one another, and wherein, optionally, the electric/magnetic module is movable among the vessels of the row of vessels.

Paragraph A19. The system of paragraph A18, wherein the vessel assembly has a length corresponding to a length or a width of a standard microplate footprint.

Paragraph A20. The system of paragraph A18 or A19, further comprising a vessel array including the vessel assembly and forming at least two or three rows of vessels, wherein each vessel of the at least two or three rows of vessels includes a respective culture chamber to contain a multicellular structure.

Paragraph A21. The system of any of paragraphs A18 to A20, further comprising a frame to hold a plurality of vessel assemblies including the vessel assembly, the frame optionally having a length and/or a width corresponding to the length and/or the width of a standard microplate footprint, wherein, optionally, the plurality of vessel assemblies are substantially identical to one another, and wherein, optionally, the plurality of vessel assemblies include a corresponding plurality of shells that are substantially identical to one another.

Paragraph A22. The system of any of paragraphs A1 to A21, wherein the vessel includes an optical window formed by a wall of the culture chamber.

Paragraph A23. The system of any of paragraphs A1 to A22, further comprising a scaffold positioned, or configured to be positioned, in the culture chamber and configured to support organoid formation in the culture chamber.

Paragraph A24. The system of any of paragraphs A1 to A23, wherein the vessel is provided by the device of any of paragraphs C1 to C20.

Paragraph B1. A method of culturing a multicellular structure, such as an organoid, the method comprising: (a) containing a multicellular structure in a culture chamber of a vessel, wherein an electric/magnetic module is removably coupled to and/or located in the vessel, optionally, at a position in or adjacent the culture chamber; and (b) powering/operating the electric/magnetic module wirelessly using a control circuit, wherein, optionally, the electric/magnetic module is removably coupled to and/or removably located in the vessel, and wherein, optionally, the electric/magnetic module is capable of being received in each of two or more compartments of the vessel, and wherein, optionally, the two or more compartments are selected from the culture chamber, one or more reservoirs, and/or a slot, and wherein, optionally, the multicellular structure is an organoid of at least 0.2, 0.5, 1, or 2 mm in diameter and is formed/grown in the culture chamber without connecting (e.g., via tubing and/or tubes) the vessel to an outside source of liquid (e.g., culture medium) and/or without electrically connecting the vessel to a wire or other electrical conductor.

Paragraph B2. The method of paragraph B1, wherein powering/operating includes wirelessly transmitting electrical energy to the electric/magnetic module.

Paragraph B3. The method of paragraph B1 or B2, wherein powering/operating is performed at least in part via inductive coupling or capacitive coupling of the control circuit and the electric/magnetic module to one another.

Paragraph B4. The method of any of paragraphs B1 to B3, wherein powering/operating includes wirelessly communicating with the electric/magnetic module using near field radiation.

Paragraph B5. The method of paragraph B4, wherein wirelessly communicating includes exchanging data with the electric/magnetic module using at least one near field communication protocol.

Paragraph B6. The method of any of paragraphs B1 to B5, wherein the electric/magnetic module includes a magnet, and wherein powering/operating includes driving movement of the magnet in the culture chamber using a magnetic field created by the control circuit.

Paragraph B7. The method of paragraph B6, wherein the culture chamber contains a pair of electric/magnetic modules each including a magnet, and wherein powering/operating includes driving the electric/magnetic modules relative to one another, and, optionally, toward one another and/or away from one another in the culture chamber.

Paragraph B8. The method of any of paragraphs B1 to B7, wherein powering/operating includes sensing a property of the multicellular structure and/or of a culture medium in the contact with the multicellular structure (e.g., located in the culture chamber) using a sensor of the electric/magnetic module.

Paragraph B9. The method of any of paragraphs B1 to B8, wherein powering/operating includes electrically stimulating the multicellular structure.

Paragraph B10. The method of any of paragraphs B1 to B9, wherein powering/operating includes driving fluid flow into and/or out of the culture chamber.

Paragraph B11. The method of any of paragraphs B1 to B10, wherein the electric/magnetic module is located in the culture chamber.

Paragraph B12. The method of any of paragraphs B1 to B11, wherein the electric/magnetic module is located in the vessel and at least predominantly (i.e., more than one-half by volume) outside the culture chamber.

Paragraph B13. The method of paragraph B12, wherein the electric/magnetic module is located in a slot defined by the vessel.

Paragraph B14. The method of any of paragraphs B1 to B13, further comprising collecting data related to the multicellular structure while the multicellular structure remains in the culture chamber.

Paragraph B15. The method of paragraph B14, wherein collecting data includes capturing an image of at least a portion of the multicellular structure.

Paragraph B16. The method of paragraph B14 or B15, wherein collecting data is performed using a sensor of the module.

Paragraph B17. The method of any of paragraphs B1 to B16, further comprising disposing the electric/magnetic module in a compartment of the vessel.

Paragraph B18. The method of paragraph B17, wherein disposing includes capturing the electric/magnetic module in the culture chamber.

Paragraph B19. The method of paragraph B17, where disposing includes placing the electric/magnetic module into the vessel but outside the culture chamber, optionally into a reservoir or a slot of the vessel.

Paragraph B20. The method of any of paragraphs B17 to B19, further comprising selecting the electric/magnetic module from a set of two or more functionally different modules located outside the vessel before disposing, optionally based on (i) a type of organoid present and/or to be cultured in the culture chamber, (ii) a culture protocol or protocol phase selected for the organoid, (iii) a test condition for the organoid, and/or (iv) a parameter to be sensed for the organoid and/or culture medium in contact with the organoid.

Paragraph B21. The method of paragraph B20, further comprising selecting two or more functionally different modules from the set, wherein disposing includes, for each selected module, coupling the selected module to the vessel and/or locating the selected module in the vessel.

Paragraph B22. The method of paragraph B20 or B21, wherein the set of two or more functionally different modules includes at least one passive module, and wherein, optionally, selecting includes selecting a passive module.

Paragraph B23. The method of any of paragraphs B1 to B22, wherein the method is performed with the system of any of paragraphs A1 to A24.

Paragraph C1. A device for culturing a multicellular structure, such as an organoid, the device comprising: (a) a shell, optionally having an open top; and (b) an insert including at least one reservoir or two or more reservoirs, the insert being configured to be received in the shell, optionally via the open top, such that the shell and the insert cooperatively form a culture chamber for the multicellular structure, the culture chamber being located under the two or more reservoirs (optionally, vertically under) and optionally in fluid communication with at least one reservoir or each of the two or more reservoirs via respective channels defined by the insert.

Paragraph C2. The device of paragraph C1, further comprising a lid configured to be placed on the shell, to cover at least one reservoir and/or each reservoir of the two or more reservoirs.

Paragraph C3. The device of paragraph C2, wherein the lid is configured to completely cover the open top of the shell.

Paragraph C4. The device of any of paragraphs C1 or C3, further comprising a scaffold configured to support organoid formation in the culture chamber.

Paragraph C5. The device of paragraph C4, wherein the scaffold is attached to a wall of the shell.

Paragraph C6. The device of paragraph C4, the shell and the insert each being part of a vessel, further comprising a module that provides the scaffold, wherein the module is configured to be coupled (optionally removably) to, and/or located in, a compartment of the vessel, such as a slot defined by the insert.

Paragraph C7. The device of paragraph C6, wherein the slot is located vertically above the culture chamber and between at least a pair of reservoirs of the two or more reservoirs.

Paragraph C8. The device of any of paragraphs C1 to C7, wherein the shell includes a section having an upper region defining a receiving space and a lower region forming a receptacle, wherein the insert is configured to be received in the receiving space, and wherein the receptacle is configured to cooperatively form the culture chamber with the insert.

Paragraph C9. The device of paragraph C8, wherein the insert is configured to form a fluid-tight seal with a plurality of side walls and/or a bottom wall of the upper region of the section.

Paragraph C10. The device of paragraph C9, wherein the insert includes a body and a gasket attached to the body, and wherein the gasket is configured to engage each side wall of the plurality of side walls and and/or the bottom wall, to form the fluid-tight seal.

Paragraph C11. The device of paragraph C10, wherein the gasket is molded on the body.

Paragraph C12. The device of any of paragraphs C1 to C11, wherein the insert forms a slot and defines an aperture at a bottom end of the slot, further comprising a module located, or configured to be located, in the slot, vertically above the aperture, and wherein, optionally, the module is an electric/magnetic module.

Paragraph C13. The device of any of paragraphs C1 to C12, wherein the device comprises a plurality of inserts, and wherein the shell forms a row of sections each configured to receive a respective insert of the plurality of inserts, to cooperatively form a culture chamber for a multicellular structure with each section and respective insert.

Paragraph C14. The device of paragraph C13, wherein the sections of the row of sections are formed integrally with one another as a single piece.

Paragraph C15. The device of paragraph C13 or C14, further comprising a lid configured to be placed onto the shell, to cover the row of sections.

Paragraph C16. The device of any of paragraphs C1 to C15, wherein a lower region of the shell forms at least one optical window of the culture chamber.

Paragraph C17. The device of paragraph C16, wherein the lower region of the shell forms at least two optical windows of the culture chamber.

Paragraph C18. The device of paragraph C17, wherein the at least two optical windows include a bottom window and at least one lateral window.

Paragraph C19. The device of paragraph C17 or C18, wherein the at least two optical windows include a pair of lateral windows arranged opposite one another.

Paragraph C20. The device of any of paragraphs C1 to C19, wherein the shell and the insert each form part of the same vessel, further comprising one or more modules each configured to be coupled to and/or located in the vessel, optionally a set of two or more functionally different modules, such as a set including at least one or at least two electric/magnetic modules, and/or at least one or at least two passive modules, optionally at least two of the functionally different modules are configured to be interchangeably placed into the same compartment (e.g., the same reservoir, culture chamber, or slot) of the vessel.

Paragraph D1. A method of culturing a multicellular structure, such as an organoid, the method comprising: (a) placing an insert, optionally including at least one reservoir or two or more reservoirs, into a shell to form a culture chamber cooperatively using the insert and the shell, the culture chamber optionally being located under (such as vertically under), and in fluid communication with, each reservoir of the at least one reservoir or the two or more reservoirs; and (b) culturing the multicellular structure in the culture chamber.

Paragraph D2. The method of paragraph D1, further comprising placing a lid onto the shell to cover the two or more reservoirs.

Paragraph D3. The method of paragraph D1 or D2, where the culture chamber is in fluid communication with each reservoir of the two or more reservoirs via channels defined by the insert.

Paragraph D4. The method of any of paragraphs D1 to D3, further comprising disposing a scaffold in the shell, wherein the scaffold is configured to promote organoid formation in the culture chamber, optionally with cells of the multicellular structure embedded in the scaffold.

Paragraph D5. The method of paragraph D4, wherein disposing includes forming the scaffold in the shell, optionally before placing an insert.

Paragraph D6. The method of paragraph D4, wherein disposing includes placing a pre-formed scaffold into the shell.

Paragraph D7. The method of paragraph D6, wherein placing a pre-formed scaffold into the shell is performed before placing an insert.

Paragraph D8. The method of paragraph D6, wherein placing a pre-formed scaffold into the shell is performed by, or after, placing an insert, and wherein, optionally, the pre-formed scaffold is already attached to a bottom side of the insert before placing an insert.

Paragraph D9. The method of any of paragraphs D1 to D8, wherein the shell includes a row of sections, wherein placing includes placing at least two inserts into the row of sections to form two or more separate culture chambers, and wherein culturing the multicellular structure includes culturing a respective organoid in each of the two or more separate culture chambers.

Paragraph D10. The method of any of paragraphs D1 to D9, further comprising collecting data related to the multicellular structure while the multicellular structure remains in the culture chamber.

Paragraph D11. The method of any of paragraphs D1 to D10, wherein collecting data includes capturing an image of at least a portion of the multicellular structure.

Paragraph D12. The method of any of paragraphs D1 to D11, wherein the method is performed with any device of paragraphs C1 to C20.

Paragraph E1. A system for culturing a multicellular structure, such as an organoid, the system comprising: (a) a vessel including a culture chamber to contain the multicellular structure, and at least one reservoir or at least two or more reservoirs and an optional slot each in fluid communication with the culture chamber; and (b) two or more modules having different functions from one another and configured to be interchangeably coupled to and/or disposed in the vessel.

Paragraph E2. The system of paragraph E1, wherein the vessel defines an aperture that communicates with the culture chamber at a bottom end of the slot.

Paragraph E3. The system of paragraph E2, wherein each module of the two or more modules is configured to be located adjacent the aperture when placed into the slot.

Paragraph E4. The system of any of paragraphs E1 to E3, wherein the two or more modules include a first module having a permeable membrane.

Paragraph E5. The system of paragraph E4, wherein the membrane is configured to form an interface between liquid in the culture chamber and liquid or gas in the first module.

Paragraph E6. The system of any of paragraphs E1 to E5, wherein at least one of the two or more modules is an electric/magnetic module.

Paragraph E7. The system of paragraph E6, wherein the at least one module includes a module having an electronic device.

Paragraph E8. The system of paragraph E6 or E7, wherein at least one of the two or more modules does not include an electronic device.

Paragraph E9. The system of any of paragraphs E1 to E8, wherein the vessel is provided by the device of any of paragraphs C1 to C20.

Paragraph F1. A method of culturing a multicellular structure, such as an organoid, the method comprising: (a) containing the multicellular structure in a culture chamber of a vessel, wherein the vessel defines a slot that communicates with the culture chamber, and wherein a first module is located in the slot; (b) removing the first module from the slot; and (c) placing a second module into the slot, wherein the second module is configured to perform a different function than the first module.

Paragraph F2. The method of paragraph F1, wherein the vessel defines an aperture providing communication between the slot and the culture chamber.

Paragraph F3. The method of paragraph F1 or F2, wherein at least one of the first and second modules extends into the culture chamber from the slot via the aperture.

Paragraph F4. The method of any of paragraphs F1 to F3, wherein at least one of the first and second modules includes an electronic device.

Paragraph F5. The method of any of paragraphs F1 to F4, wherein a module of the first and second modules includes a membrane that forms an interface between liquid in the culture chamber and liquid or gas in the module.

Paragraph F6. The method of any of paragraphs F1 to F5, wherein at least one module of the first and second modules includes an electrode that contacts the multicellular structure and/or liquid in the culture chamber.

Paragraph F7. The method of any of paragraphs F1 to F6, further comprising powering/operating one module of the first and second modules wirelessly using a control circuit while the one module is located in the slot.

Paragraph F8. The method of any of paragraphs F1 to F7, wherein the vessel is provided by the device of any of paragraphs C1 to C20.

Paragraph G1. An organoid culture vessel without the need of connecting tubes and wires to the vessel itself.

Paragraph H1. A method of organoid culture, the method comprising forming/growing an organoid (e.g., a large organoid) in a vessel without connecting the vessel to an external source of liquid (e.g., via one or more tubes, such as tubing) and/or without electrically connecting the vessel to an external electrical conductor (e.g., an electrical conductor that is electrically connected to an electric/magnetic device and/or a control circuit).

While the invention(s) has been described through the above examples and features, it will be understood by those of ordinary skill in the art that a wide variety of modifications, combinations and variations of the examples and features may be made without departing from the inventive concepts herein disclosed. Moreover, the invention(s) should not be viewed as being limited to any specific purposes or embodiments described herein, but rather should be viewed as being applicable to accomplish a wide variety of purposes beyond those described herein. This disclosure described some examples of the present technology with reference to the accompanying drawings, in which only some of the possible examples were shown. Other aspects can, however, be embodied in many different forms and should not be construed as limited to the examples set forth herein even if not expressly exemplified in combination. Rather, these examples were provided so that this disclosure was thorough and complete and fully conveyed the scope of the possible examples to those skilled in the art.

We claim:

1. A system for culturing a multicellular structure comprising:
    a vessel including a culture chamber configured to contain the multicellular structure;
    an electric/magnetic module located in the vessel, at a position in or adjacent the culture chamber; and
    a control circuit configured to wirelessly power and/or operate the electric/magnetic module.

2. The system of claim 1, wherein the control circuit is configured to wirelessly transmit electrical power to the electric/magnetic module via inductive coupling or capacitive coupling.

3. The system of claim 1, wherein the electric/magnetic module is contained, or configured to be contained, in the culture chamber and includes a magnet, and wherein the control circuit is configured to create a magnetic field that drives movement of the magnet in the culture chamber.

4. The system of claim 1, wherein the electric/magnetic module includes a chemical sensor, an electrical sensor, an optical sensor, and/or a temperature sensor.

5. The system of claim 1, wherein the electric/magnetic module includes a pump configured to drive fluid flow into and/or out of the culture chamber.

6. The system of claim 1, wherein the electric/magnetic module is located, or configured to be located, in a slot adjacent the culture chamber, and wherein, optionally, the vessel defines an aperture that provides fluid communication between the slot and the culture chamber.

7. The system of claim 6, wherein vessel includes two or more reservoirs in fluid communication with the culture chamber, wherein the slot is located vertically above the culture chamber and, optionally, between at least a pair of the two or more reservoirs, and wherein, optionally, each reservoir of the two or more reservoirs separately communicates with the culture chamber.

8. The system of claim 1, further comprising a vessel assembly forming a row of vessels that are connected to one another and include the vessel, each vessel of the row of vessels including a respective culture chamber to contain a multicellular structure, wherein, optionally, the vessels of the row of vessels are substantially identical to one another.

9. The system of claim 6, further comprising a frame to hold a plurality of vessel assemblies including the vessel assembly, the frame optionally having a length and/or a width corresponding to the length and/or the width of a standard microplate footprint.

* * * * *